(12) United States Patent
Wertenberger et al.

(10) Patent No.: US 11,365,068 B2
(45) Date of Patent: Jun. 21, 2022

(54) ROBOTIC SYSTEMS AND METHODS FOR OPERATING A ROBOT

(71) Applicant: ABB Schweiz AG, Baden (CH)

(72) Inventors: Steven Wertenberger, Prescott, AZ (US); Thomas Watson, Novi, MI (US); Jonathan D. Ferrell, Denver, CO (US)

(73) Assignee: ABB Schweiz AG, Baden (CH)

( * ) Notice: Subject to any disclaimer, the term of this patent is extended or adjusted under 35 U.S.C. 154(b) by 17 days.

(21) Appl. No.: 16/122,308

(22) Filed: Sep. 5, 2018

(65) Prior Publication Data

US 2019/0071261 A1 Mar. 7, 2019

Related U.S. Application Data

(60) Provisional application No. 62/554,462, filed on Sep. 5, 2017, provisional application No. 62/554,172, filed on Sep. 5, 2017.

(51) Int. Cl.
| | |
|---|---|
| *B65G 47/90* | (2006.01) |
| *B25J 9/16* | (2006.01) |
| *B25J 15/00* | (2006.01) |
| *B07C 5/00* | (2006.01) |
| *B07C 5/02* | (2006.01) |

(52) U.S. Cl.
CPC ............ *B65G 47/90* (2013.01); *B07C 5/00* (2013.01); *B07C 5/02* (2013.01); *B25J 9/1697* (2013.01); *B25J 15/0052* (2013.01); *B07C 2501/0063* (2013.01)

(58) Field of Classification Search
CPC ...... B25J 9/1664; B25J 9/1666; B25J 9/1697; B25J 15/0052; B65G 47/90; B07C 5/02; B07C 5/00; G05B 2219/40053; G05B 2219/40476
See application file for complete search history.

(56) References Cited

U.S. PATENT DOCUMENTS

| | | | |
|---|---|---|---|
| 6,579,053 B1 | 6/2003 | Grams et al. | |
| 7,313,464 B1* | 12/2007 | Perreault | B25J 9/1666 |
| | | | 318/568.1 |
| 8,406,923 B2 | 3/2013 | Ueyama et al. | |
| 9,469,028 B2 | 10/2016 | Sisbot et al. | |
| 9,481,518 B2 | 11/2016 | Neiser | |
| 2009/0028686 A1 | 1/2009 | Tallis et al. | |
| 2010/0004778 A1* | 1/2010 | Arimatsu | B25J 9/1697 |
| | | | 700/214 |
| 2013/0200912 A1* | 8/2013 | Panagas | G01R 31/2893 |
| | | | 324/756.01 |
| 2014/0316573 A1* | 10/2014 | Iwatake | B25J 9/1697 |
| | | | 700/258 |
| 2015/0003678 A1* | 1/2015 | Watanabe | B25J 9/1697 |
| | | | 382/103 |
| 2018/0290307 A1* | 10/2018 | Watanabe | B25J 9/1676 |

* cited by examiner

*Primary Examiner* — Timothy R Waggoner
(74) *Attorney, Agent, or Firm* — Leydig, Voit & Mayer, Ltd.

(57) ABSTRACT

A method for operating a robot includes providing target data for a target object; determining whether a pre-pick target for the target object is reachable by the robot; determining whether a pick target is reachable by the robot; and executing a pick routine directing the robot to pick up the target object and deposit the target object at a desired location responsive to a determination that the pre-pick target and the pick target are reachable by the robot.

35 Claims, 10 Drawing Sheets

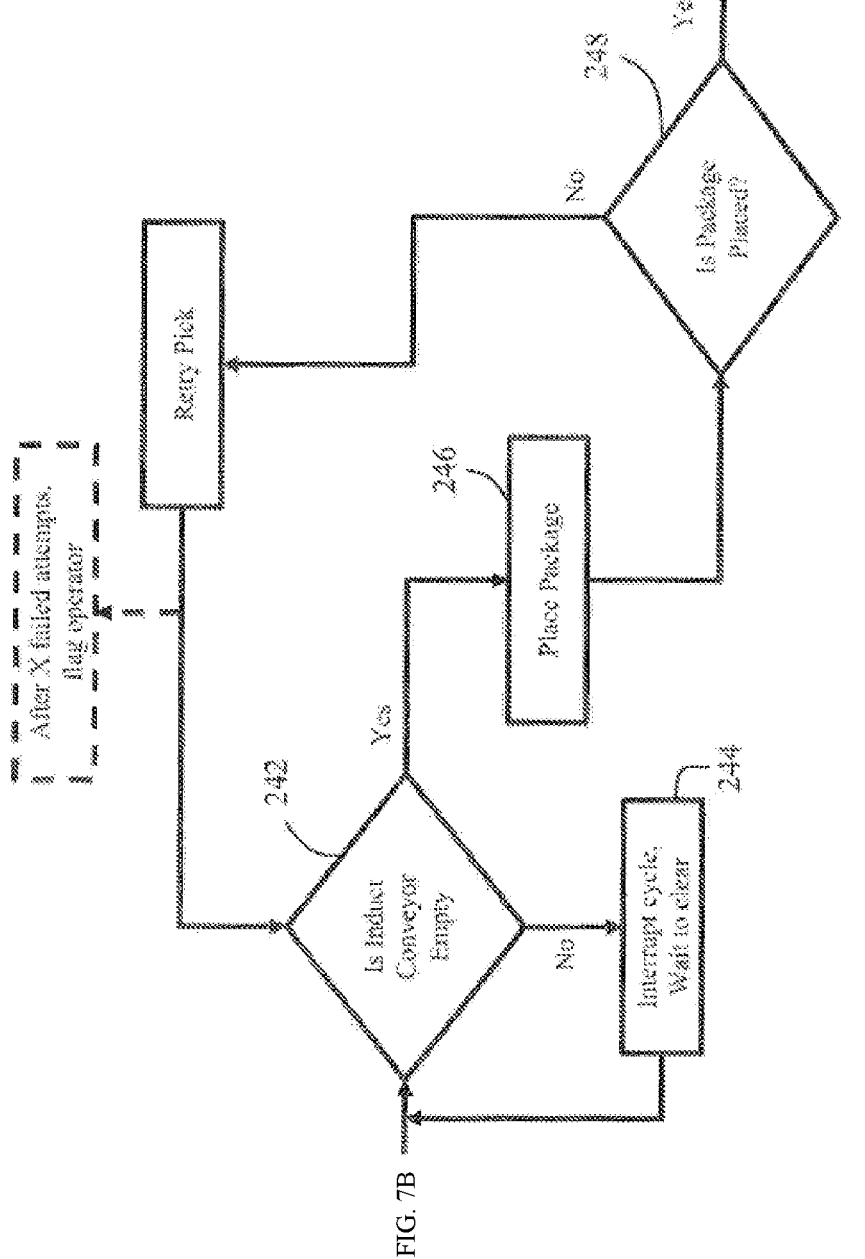

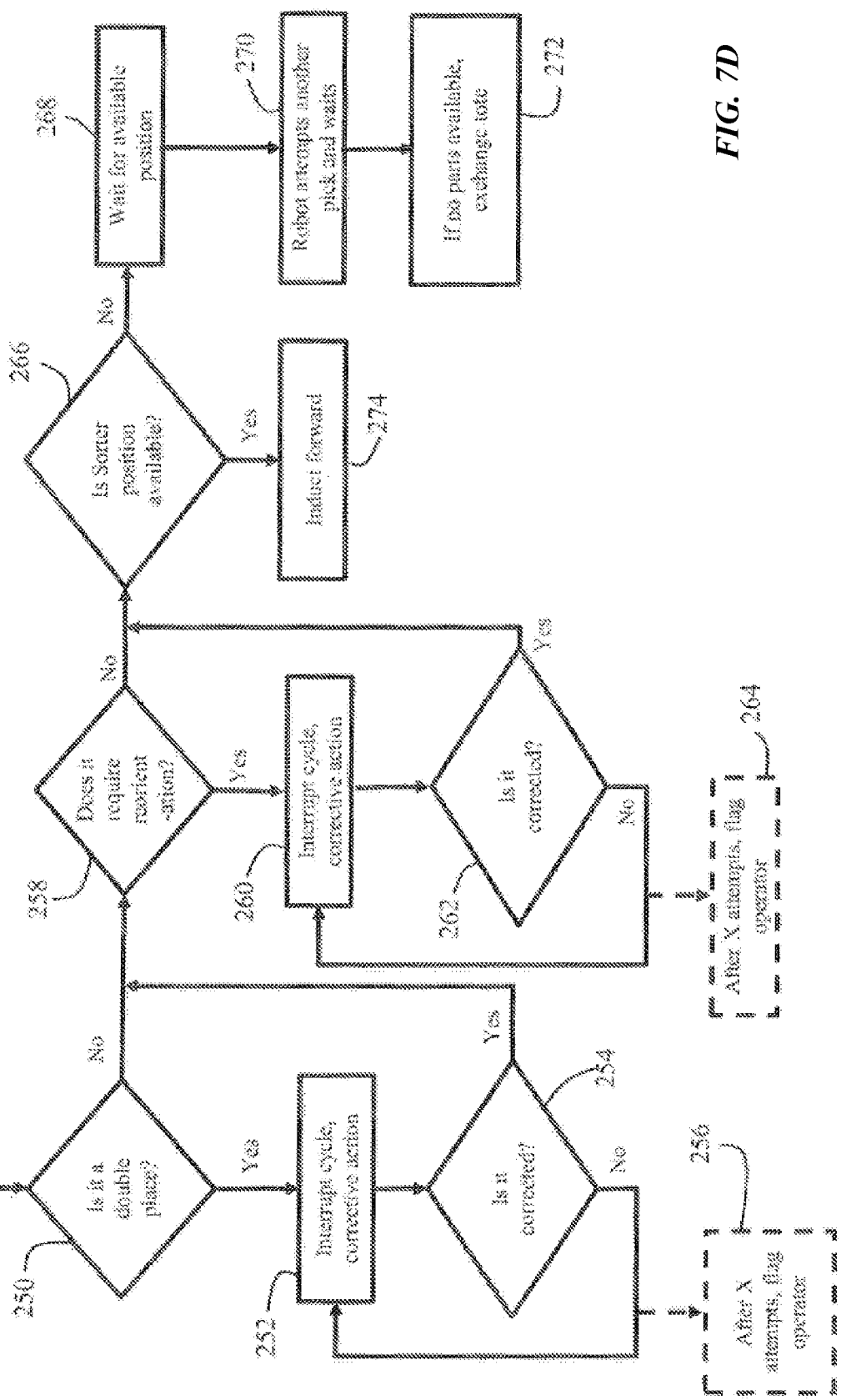

ROBOTIC SYSTEMS AND METHODS FOR OPERATING A ROBOT

TECHNICAL FIELD

The present application generally relates to robots, and more particularly, but not exclusively, to robotic systems and methods for operating a robot.

BACKGROUND

Robotic systems of various types remain an area of interest. Some existing systems have various shortcomings, drawbacks and disadvantages relative to certain applications. For example, in some robotic systems, operator intervention may be reduced, and throughput may be increased. Accordingly, there remains a need for further contributions in this area of technology.

SUMMARY

A method for operating a robot includes providing target data for a target object; determining whether a pre-pick target for the target object is reachable by the robot; determining whether a pick target is reachable by the robot; and executing a pick routine directing the robot to pick up the target object and deposit the target object at a desired location responsive to a determination that the pre-pick target and the pick target are reachable by the robot. Another method includes capturing, by one or more perception systems, a background image of at least a picking bin; capturing, by the one or more perception systems, a component image of one or more components in the picking bin; determining, based at least in part on an evaluation involving both the component image and the background image, whether a robot can pick at least one of the one or more components from the picking bin; displacing, after determining the robot cannot pick at least one of the one or more components from the picking bin, the one or more components within the picking bin; capturing, by the one or more perception systems, an updated component image of the one or more components in the picking bin after displacing the one or more components within the picking bin; determining, based at least in part on an evaluation involving both the updated component image and the background image, whether the robot can pick at least one of the one or more components from the picking bin; and picking by the robot, after determining the robot can pick at least one of the one or more components from the picking bin, at least one of the one or more components from the picking bin.

BRIEF DESCRIPTION OF THE FIGURES

The description herein makes reference to the accompanying drawings wherein like reference numerals refer to like parts throughout the several views, and wherein:

FIGS. 7A-7D illustrate a flow diagram of an exemplary process for operation of a robotic singulation system according to certain embodiments of the subject application.

DETAILED DESCRIPTION OF THE ILLUSTRATIVE EMBODIMENTS

Figure 1:
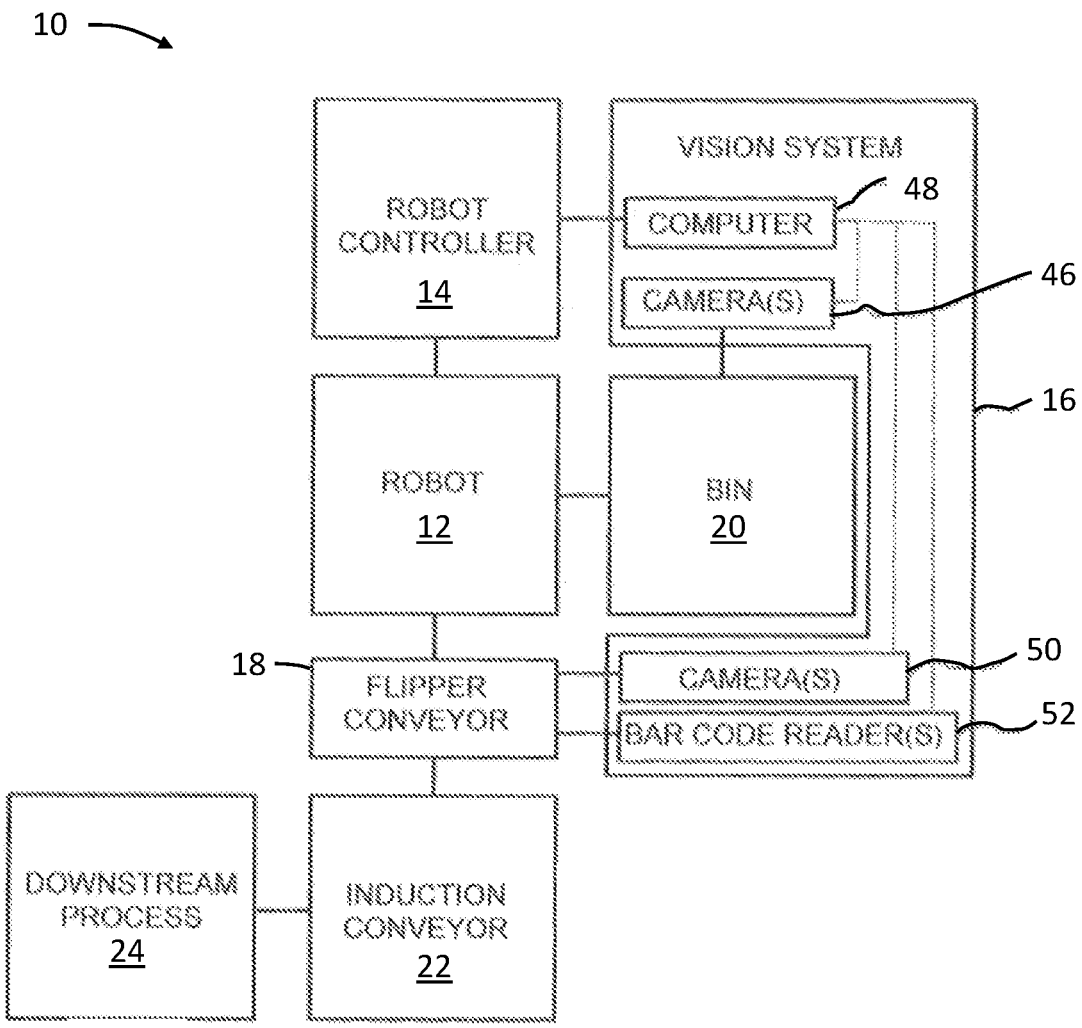
FIG. 1 schematically illustrates some aspects of a non-limiting example of a robotic system for removing objects from a bin and placing the objects on a conveyor in accordance with an embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to FIG. 1, some aspects of a non-limiting example of a robotic system 10 in accordance with an embodiment of the present invention is schematically depicted. Robotic system 10 includes a robot 12, a computer-based robotic controller 14, a robotic vision system 16 and a flipper conveyor system 18. In one form, robotic system 10 is operative to retrieve or pick objects, e.g., packages, parts or the like, from a picking bin 20 and place the objects onto an outfeed conveyor, e.g., an induction conveyor 22, for induction into a downstream process 24. The objects are delivered to bin 20 randomly, e.g., by a supply or infeed conveyor (not shown), for picking by robotic system 10. The objects may vary in size and shape. Also, the objects vary in orientation in the bin, e.g., due to the random nature of the delivery of the objects to the bin, due to the variations in the size and shape of the objects, and due to the fact that the objects may pile up on top of each other in bin 20 in a random manner.

In one form, controller 14 is microprocessor based, and executes program instructions are in the form of software stored in a memory (not shown). However, it is alternatively contemplated that the controller 14 and associated program instructions may be in the form of any combination of software, firmware and hardware, including state machines, and may reflect the output of discreet devices and/or integrated circuits, which may be co-located at a particular location or distributed across more than one location, including any digital and/or analog devices configured to achieve the same or similar results as a processor-based controller or computer executing software or firmware based instructions or a programmable logic controller.

Robot 12 is constructed to pick the objects up from bin 20 and to deposit the objects onto flipper conveyor system 18 under the direction of robotic controller 14. Flipper conveyor system 18 is operative, under the direction of robotic controller 14, to transfer the objects to induction conveyor 22 in the orientation as deposited by robot 12, or to flip the objects over and then transfer the objects in the flipped-over orientation to induction conveyor 22. For example, in some embodiments, once an object 44 is placed onto flipper conveyor system 18, a determination is made as to whether a particular feature, e.g., a bar code, is found on the top of the object after being placed onto flipper conveyor system 18. If so, flipper conveyor system 18 deposits the object onto induction conveyor 22 in the same orientation as the object was deposited onto flipper conveyor system 18. If not, flipper conveyor system 18 flips the object over and then deposits it onto induction conveyor 22. Induction conveyor 22 is operative to induct the object into a downstream process 24, e.g., to deliver the object to downstream process 24. A non-limiting example of a downstream process 24 is a mail/shipping processing or distribution system, although downstream process 24 may be any industrial, commercial or other process in other embodiments.

Figure 2:
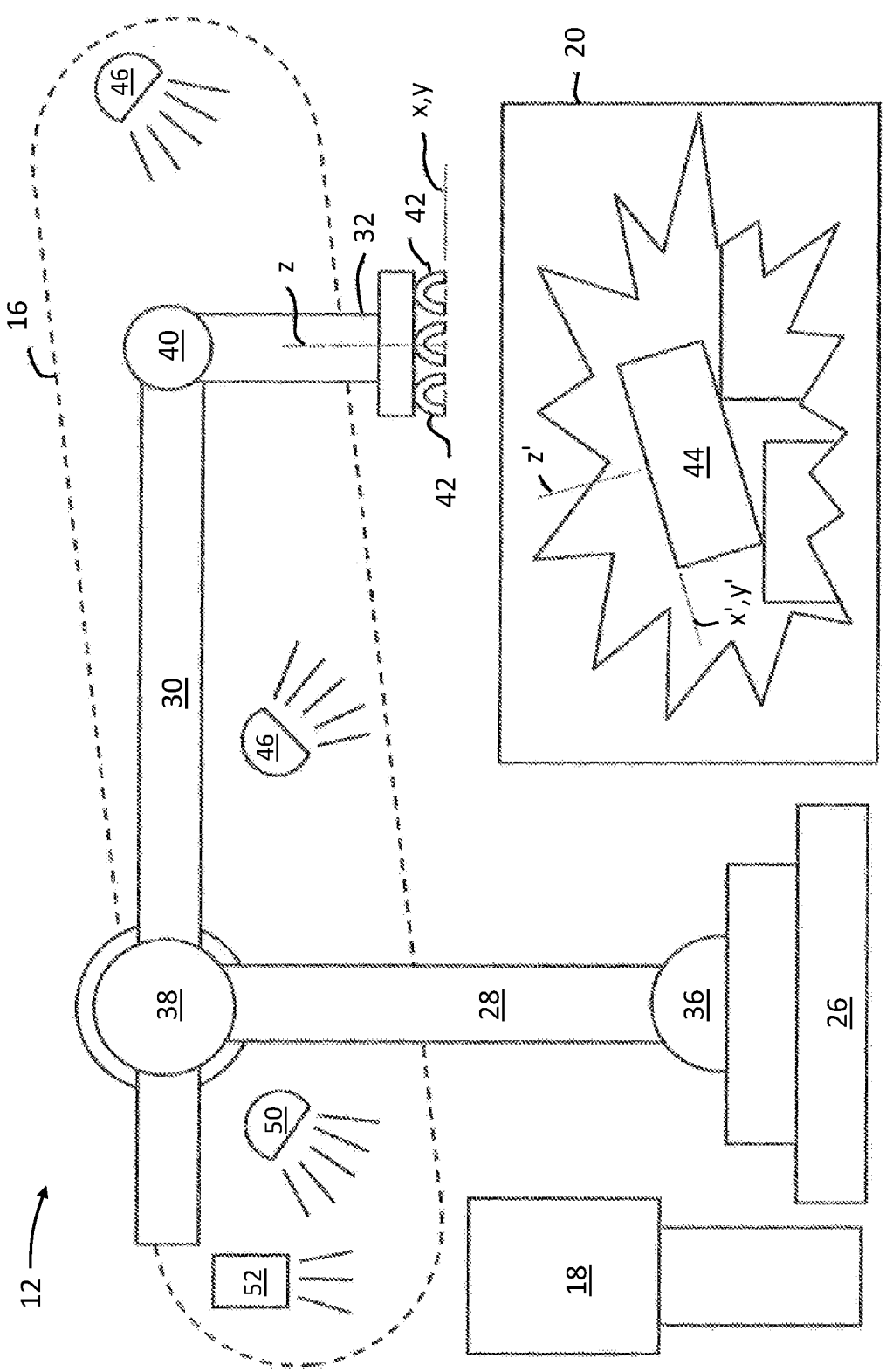
FIG. 2 schematically illustrates some aspects of a non-limiting example of the robotic system of FIG. 1 in accordance with an embodiment of the present invention.

Referring to FIG. 2, robot 12 includes a base 26, a lower arm 28, an upper arm 30 and an end effector 32, e.g., a gripper 34. In one form, robot 12 is a 6-axis robot. In other embodiments, robot 12 may have a greater or lesser number of axes or degrees of freedom. Lower arm 28 is coupled to base 26 via a shoulder joint system 36. Upper arm 30 is coupled to lower arm 28 via an elbow joint 38. End effector 32 is coupled to upper arm 30 via a wrist joint 40. In one form, end effector 32 is a gripper 34 in the form of a vacuum gripper having a plurality of vacuum powered suction cups 42 configured to pick up objects 44 from bin 20. In one form, the suction cups 42 are arranged in a 3×3 grid. In other embodiments, suction cups 42 may be arranged in other geometric orientations. The number of suction cups may vary with the needs of the application. In other embodiments, other forms of grippers or other types of end effectors may be employed. In one form, the bottoms of suction cups 42 form an XY plane of end effector 32.

At startup, an operator is asked to verify that picking bin 20 is clean and empty. Robot 12 is at a home position at startup. Before objects 44 are placed into bin 20, vision system 16 acquires a background image of bin 20, e.g., using one or more cameras 46, which are constructed to provide 3-dimensional image data, e.g., in the form of a point cloud. The number of cameras may vary with the needs of the application, and thus, various embodiments may have one or any other number of cameras. Cameras 46 may be two or more 2-dimensional cameras used in combination to provide 3-dimensional images, or may be one or more 3-dimensional cameras. The background image of bin 20 without any objects 44 in it is used for background subtraction, and helps to prevent stickers, labels, wear, scratches or other semi-permanent or permanent changes to bin 20 from being mistaken as objects 44. After startup, objects 44 are then randomly deposited into bin 20, e.g., via the infeed conveyor, for subsequent picking by robot 12.

In one form, prior to each pick by robot 12, computer 48 executes program instructions for vision system 16 to take an image, and to subtract the background image, yielding a modified image. In one form, computer 48 is considered a part of vision system 16. Computer 48 is in communication with controller 14. In other embodiments, computer 48 may be a separate computer, e.g., a stand-alone computer, or may be a computer associated with robotic system 12, e.g., may be part of controller 14. In some embodiments, vision system 16 may take a new image after completing a number of picks, followed by subtracting the background image from the new image.

After subtracting the background image, computer 48 executes program instructions to analyze the contents of bin 20 based on the modified image, e.g., prior to each pick. Computer 48 then executes program instructions to select or designate, e.g., randomly, a target object 44 in the bin from the modified image for picking by robot 12. Computer 48 next executes program instructions to determine target data for the target object 44. The target data may include the X', Y' and Z' axes of the target object 44, e.g., of the top-most surface of the designated target object 44, and a score for the target object 44. In some embodiments, computer 48 may also execute program instructions to determine the orientation of the target object 44. Computer 48 provides or transmits the score and the other target data to controller 14.

The score may relate to, for example, a measure of confidence that vision system 16 has designated or selected a good target. For instance, the score may be based on the degree to which the target object has a well-defined surface or shape in the image, e.g., of a predetermined geometry, for example, a rectangular geometry. The score may also be based on a measure of confidence as to how well vision system 16 determined the X', Y' and Z' axes of the target object 44. This may include analyzing as to whether vision system 16 can determine the X'Y' plane that a planar or non-planar surface of the target object 44, e.g., the X'Y' plane of a rectangular object's flat or irregular surface. The score may also be based on a measure of confidence as to how well vision system 16 correctly or accurately determined the orientation of the surface, e.g., as indicated by roll or rotation about X, Y and Z axes in an object, target or other coordinate system.

If the score is greater than a predetermined score value, e.g., 50 on a scale of 0-100, or 50%, computer 48 executes program instructions to designate the target object 44 for potential picking from bin 20. Vision system 16 provides, e.g., transmits, target data for the target object 44 to controller 14. In some embodiments, the target data includes the score, and the X, Y and Z axis data for the target object 44, i.e., the X', Y' and Z' axis data for the target object, in preparation for picking the target object 44 from the bin. In some embodiments, vision system 16 also provides orientation data for the target object to controller 14. Before the target is picked up by robot 12, controller 14 executes program instructions to perform a reachability check or determination, e.g., as described herein below. In some embodiments, the reachability check is performed based on the coordinate data for the target object. If the target object 44 passes the reachability check, controller 14 executes program instructions to pick the target object from bin 20 and deposit the target object on flipper conveyor system 18.

Computer 48 may also execute program instructions to determine if the object is on its side, for example, by determining whether the length of the observed Z-axis dimension of the target object 44 is greater than the lengths of the observed X and Y dimensions of the target object. If the observed Z-axis or vertical dimensional component of the object is greater than the observed X and Y axis or horizontal dimensional components of the object, the target object 44 is determined to be on its side. In some embodiments, robotic system 12 preferably picks objects 44 by gripping the objects 44 on the object 44 X'Y' plane, which is more readily done when the X'Y' plane of the object is not vertical, and more preferably is horizontal or within some desired angle of the horizontal.

If the target object is on its side, a reachability check is also performed. If the target object passes the reachability check, robot controller 14 executes program instructions to pick up the target object 44 and move or toss it to change its orientation, e.g., so that it is no longer resting on its side or no longer resting predominantly on its side. For example, the move or toss is performed to make the object 44 land or come to rest predominantly on the surface having the largest dimensions or area or surface, e.g., a top or bottom surface.

If the score is less than 50%, another target object 44 is designated, e.g., randomly, and the process is repeated for the new target object. In some embodiments, a new image of bin 20 with objects 44 disposed therein is taken (and the background subtracted) after determining a score of less than 50% for a previous target object and prior to designating another, new, potential target object. In other embodiments, the same image may be used as was used for the previous target object.

If the score is less than 50% a predetermined number, N, of times, in a row, i.e., for N different designated target objects in a row, controller 14 executes program instructions to perform a stir routine on the objects in bin 20, e.g., by stirring, shaking, agitating or tossing objects 44 about in bin 20. In one form, N=3. In other embodiments, N may be any value suitable for the particular application. If the stir routine includes tossing or moving the target object 44, controller 14 executes program instructions to perform a reachability check on the target object 44 prior to picking up the target object 44 for tossing.

Thus, if a target object 44 has a score of 50% or greater and if the target object 44 was not determined to be on its side, a reachability check or determination is performed. If the object passes the reachability check, i.e., is determined to be reachable, controller 14 executes program instructions to pick the target object 44 from bin 20, and deposit the target object onto flipper conveyor system 18. A vision system, e.g., vision system 16 then executes program instructions, e.g., using computer 48, to determine, using one or more cameras 50, whether more than one target object 44 was inadvertently picked from bin 20 and placed onto flipper conveyor system 18. In addition, one or more bar code readers 52 are used to determine whether a bar code is presented on the top of the target object 44 that is on flipper conveyor system 18. If so, flipper conveyor system 18 moves in one direction to deposit the target object 44 onto induction conveyor 22 in the same orientation as it was placed on flipper conveyor system 18. If not, flipper conveyor system 18 moves in another direction to flip the target object 44 over, and then deposits the flipped target object 44 onto induction conveyor 22.

Figure 3:
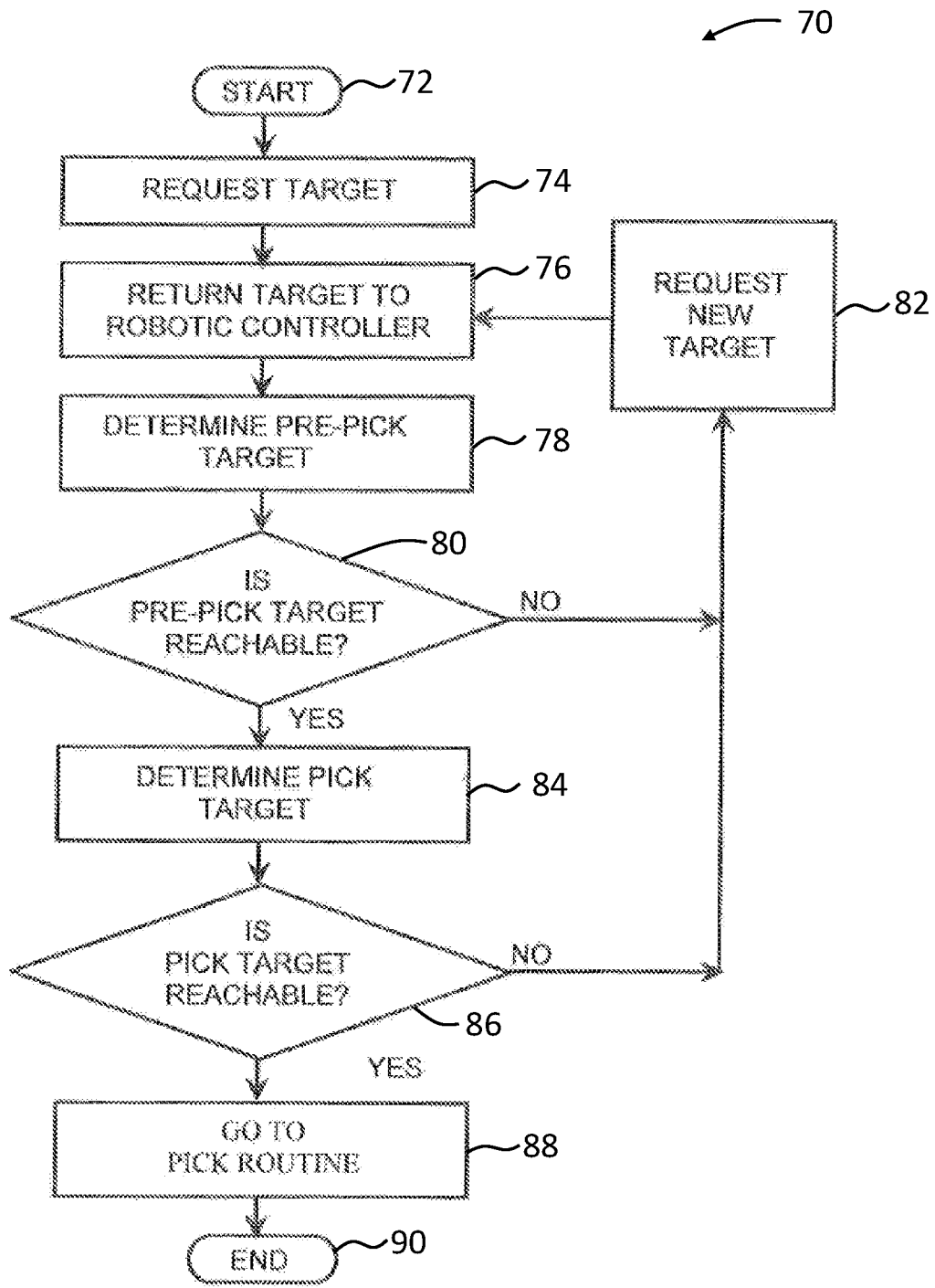
FIG. 3 illustrates a flowchart depicting some aspects of a non-limiting example of a method for operating a robot in accordance with an embodiment of the present invention.

Referring to FIG. 3, some aspects of a non-limiting example of a method 70 for operating a robot and for performing a reachability check or determination in accordance with an embodiment of the present invention is illustrated. The reachability check is performed by controller 14.

Process flow begins at block 72. At block 74, a target object is requested by controller 14. At block 76, a target object or a new target object is returned to controller 14 from vision system 16, e.g., from computer 48. For example, the target object is obtained and received by controller 14 in response to the request at block 74 (or block 82). The target object 44 may be a target object having a score greater than 50% intended for placement onto flipper conveyor system 18. Alternatively the target object 44 may be a target object that was determined to be resting on its side or resting predominantly on its side, and is intended to be tossed in order to change its orientation, so that a pick may subsequently be performed to remove it from bin 20 and deposit it onto flipper conveyor system 18 on its top surface or bottom surface. As another alternative, the target object may be a target object that is selected to be tossed or moved as part of a stir routine.

At block 78, controller 14 executes program instructions to determine a pre-pick target for the target object 44. In one form, the pre-pick target is a target location wherein a predetermined plane of end effector 32 (e.g., an XY plane defined by the bottom surface of the grid of suction cups 42 of vacuum gripper 34) is parallel to a predetermined plane of the target object 44; wherein predetermined axis of end effector 32 is coincident with a predetermined axis of target object 44; and wherein the predetermined plane of end effector 32 is offset along the predetermined axis of the end effector 32 and the predetermined axis of the target object 44 e.g., anywhere from a millimeter to a few inches in some embodiments. The predetermined planes and predetermined axes may vary with the needs of the application. The offset may vary with the needs of the application, and may be outside the mentioned range. In one form, the predetermined plane of end effector 32 is the XY plane of end effector 32; the predetermined plane of the target object 44 is the X'Y' plane of the target object; and the offset is along the Z axis of end effector 32 and/or the Z' axis of the target object 44. For example, the pre-pick target is a target location wherein the XY plane of end effector 32 is parallel to and offset from the X'Y' plane of target object 44 along the Z and/or Z' axes in a direction away from target object 44. In one example, the Z axis of end effector 32 passes through the center of end effector 32, e.g., through the center of the grid of suction cups 42, and the Z' axis of the target object 44 passes through the center of the target object 44.

At block 80, controller 14 executes program instructions to determine whether the pre-pick target is reachable by end effector 32. For example, in one form, the determination includes assessing whether rotation about each of the robot 12 axes necessary to orient end effector 32 at the pre-pick location are achievable, e.g., within the mechanical limits of the ability of robot 12 and/or within other constraints. For example, in some situations, spatial constraints of robot 12 and/or its environment and/or bin 20 may limit the motion of robot 12 and prevent it from reaching the pre-pick target. In some situations, the target object 44 may be oriented in a way that makes it unreachable by robot 12. If the pre-pick target is not reachable, process flow proceeds to block 82. Otherwise, if the pre-pick target is reachable, process flow proceeds to block 84.

At block 82, controller 14 executes program instructions to obtain a new target object, e.g., by requesting a new target object 44 from vision system 16. In some embodiments, a stir routine may be performed, e.g., by agitating or mixing the objects 44 in bin 20 prior to requesting a new target object 44. After requesting the new target object, process flow proceeds to block 76, where the new target object 44 is returned to controller 14 from vision system 16.

At block 84, controller 14 executes program instructions to determine a pick target for the target object 44. In one form, the pick target is a target location wherein a predetermined plane of end effector 32 (e.g., vacuum gripper 34) coincides with a predetermined plane of the target object 44. For example, the pick target may be a location wherein the XY plane of end effector 32, defined at the bottoms of suction cups 42, coincides with the X'Y' plane of target object 44. In some embodiments, the pick target is also a location wherein a predetermined axis of end effector 32 is coincident with a predetermined axis of target object 44, e.g., wherein the Z axis of end effector 32, e.g., an axis passing through the center of the group of suction cups 42 and end effector 32, is coincident with the Z' axis of target object 44, e.g., an axis passing through the center of the target object 44. The predetermined planes and predetermined axes may vary with the needs of the application.

At block 86 controller 14 executes program instructions to determine whether the pick target is reachable by end effector 32. For example, in one form, the determination includes assessing whether rotation about each of the 6 axes of robot 12 necessary to orient end effector 32 at the pick location are achievable, e.g., within the mechanical limits of the ability of robot 12, and in some embodiments also within other constraints. For example, in some situations, spatial constraints of robot 12 and/or its environment and/or bin 20 may limit the motion of robot 12 and prevent it from reaching the pick target. In some situations, the target object 44 may be oriented in a way that makes it unreachable by robot 12. If the pick target is not reachable, process flow proceeds to block 82. Otherwise, if the pick target is reachable, process flow proceeds to block 88.

At block 88, controller 14 executes program instructions to perform a pick routine, e.g., to pick target object 44 from bin 20 and deposit it onto flipper conveyor 18; to pick target 44 from bin 20 and move or toss it to change its orientation in response to a determination that target 44 is on its side, or to pick target 44 from bin 20 and move or toss it as part of a stir routine. Process flow for the reachability check ends at block 90 after initiation of the pick routine.

By executing a reachability determination to determine whether a pre-pick target and a pick target is achievable, e.g., as described hereinabove, embodiments of the present invention may prevent robot 12 from moving to an unreachable target and generating an error, reducing the need for operator invention, and in some embodiments, saving the time associated with attempting to reach an unreachable target, thus increasing throughput of the robotic cell.

Figure 4:
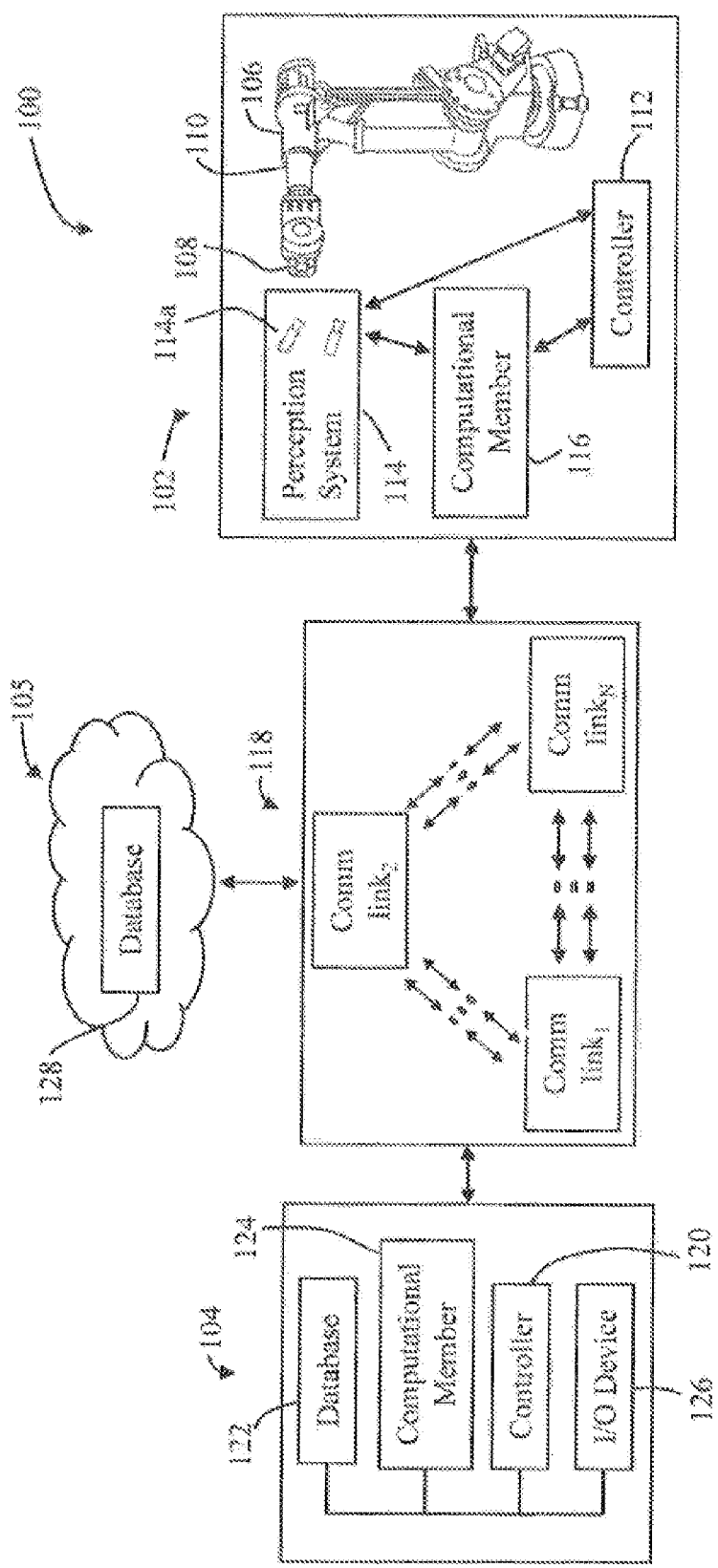
FIG. 4 illustrates a schematic representation of an exemplary robotic system according to an illustrated embodiment of the present application.

FIG. 4 illustrates a schematic of an exemplary robotic system 100 according to another illustrated embodiment of the present application. As shown, according to certain embodiments, the robotic system 100 can include at least one robot station 102 that is communicatively coupled to at least one management system 104, such as, for example, via a communication network or link 118. The management system 104 can be local or remote relative to the robot station 102. Further, according to certain embodiments, the robotic system 100 can also include, or be in operable communication with, one or more supplemental database systems 105 via the communication network or link 118. The supplemental database system(s) 105 can have a variety of different configurations. For example, according to the illustrated embodiment, the supplemental database system(s) 105 can be, but is not limited to, a cloud based database.

According to certain embodiments, the robot station 102 includes one or more robots 106 having one or more degrees of freedom. For example, according to certain embodiments, the robot 106 can have, for example, six degrees of freedom. According to certain embodiments, an end effector 108 can be coupled or mounted to the robot 106. The end effector 108 can be a tool that is mounted to a wrist or arm 110 of the robot 106. Further, at least portions of the wrist or arm 110 and/or the end effector 108 can be moveable relative to other portions of the robot 106 via operation of the robot 106 and/or the end effector 108, such for, example, by an operator of the management system 104 and/or by programming that is executed to operate the robot 106, as discussed below.

According to certain embodiments, the robot 106 can be operative to position and/or orient the end effector 108 at locations within the reach of a work envelope or workspace of the robot 106, which can accommodate the robot 106 in utilizing the end effector 108 to perform work, including, for example, grasp and hold one or more components, parts, packages, apparatuses, assemblies, or products, among other items (collectively referred to herein as "components"). A variety of different types of end effectors 108 can be utilized by the robotic system 100, including, for example, a tool that can grab, grasp, or otherwise selectively hold and release a component that is to be removed from a picking bin and placed at a selected position on an induction conveyor. Further, for example, operation of the robot 106 and/or the end effector 108 can be utilized to stir components that are within a picking bin and/or agitate, including, for example, shake, the picking bin in a manner that may disrupt or otherwise facilitate a change in position and/or orientation of one or more components that are at least partially contained in, or in the general proximity of, the picking bin, as discussed below.

Figure 5:
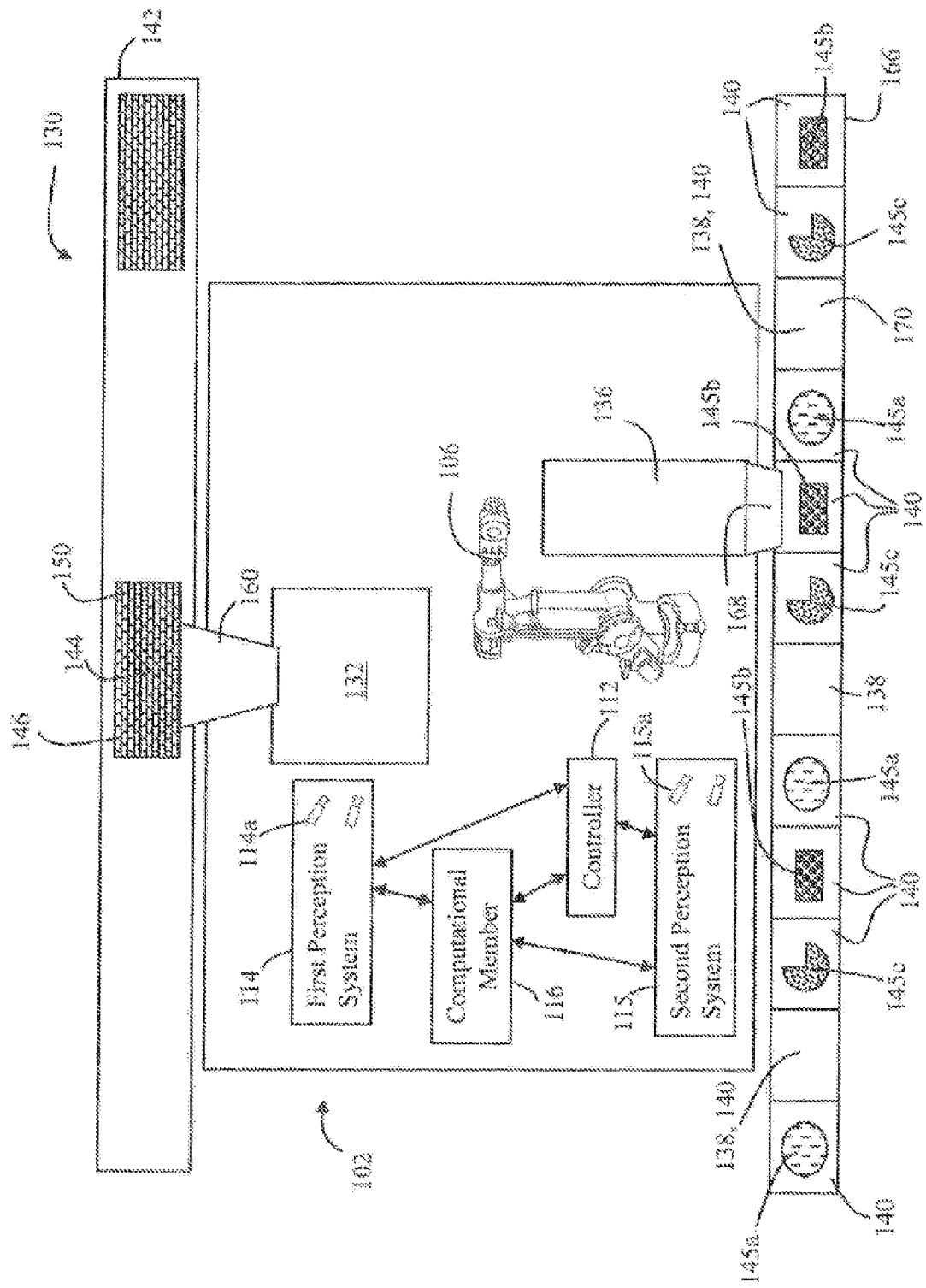
FIGS. 5 and 6 illustrate schematic representations of at least portions of an exemplary robotic singulation system that can employ the robotic system depicted in FIG. 4.
Figure 6:
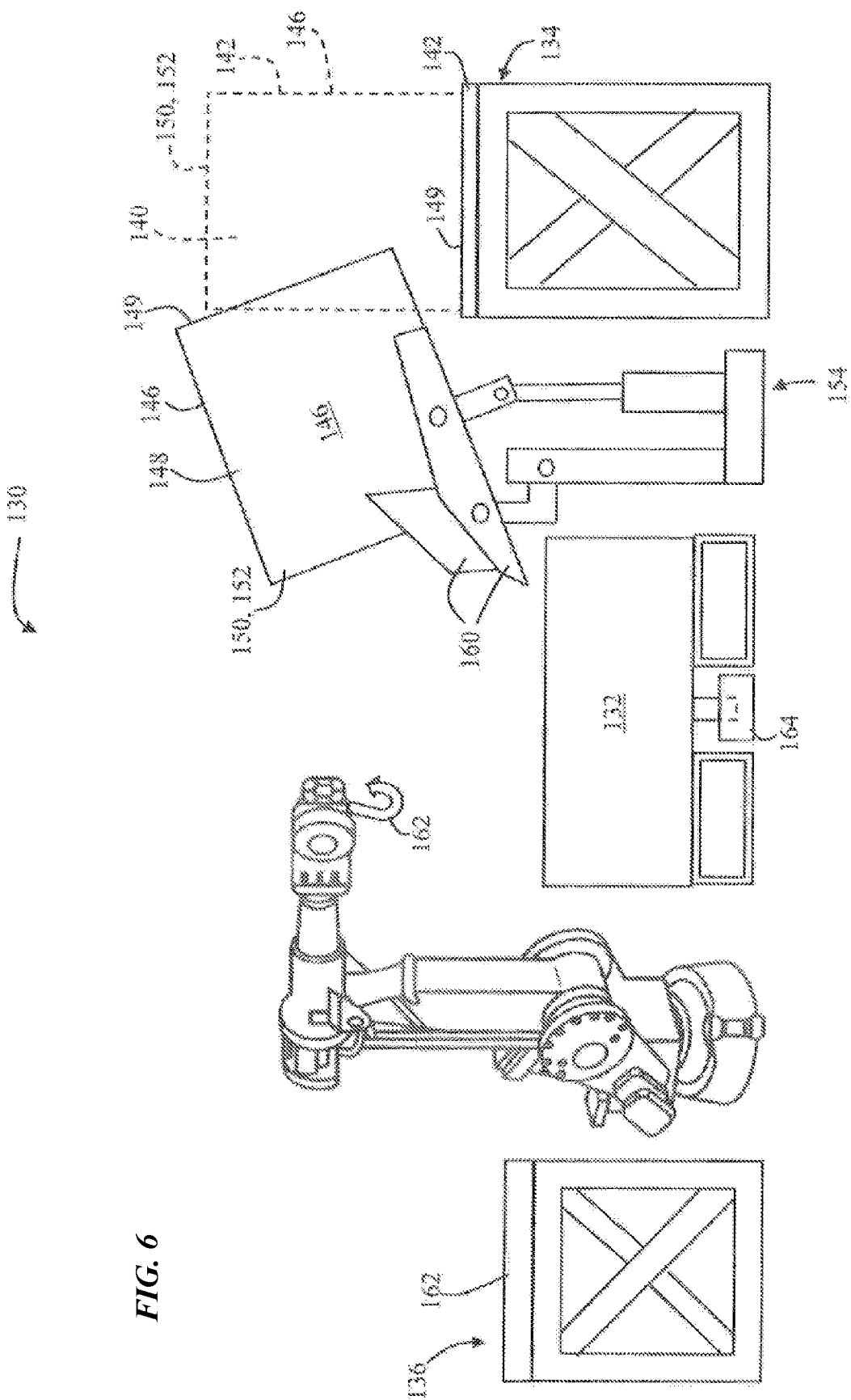

The robot 106 can include or be electrically coupled to one or more robotic controllers 112. For example, according to certain embodiments, the robot 106 can include and/or be electrically coupled to one or more controllers 112 that may, or may not, be discrete processing units, such as, for example, a single controller or any number of controllers. The controller 112 can be configured to provide a variety of functions, including, for example, be utilized in the selective delivery of electrical power to the robot 106, the control of the movement and/or operations of the robot 106, and/or the operation of other equipment that is mounted to the robot 106, including, for example, the end effector 108, and/or the operation of equipment not mounted to the robot 106 but which are an integral to the operation of the robot 106 and/or to equipment that is associated with the operation of the robot 106, including, for example, the below discussed induction conveyor 136 (FIGS. 5 and 6). Moreover, the controller 112 can take a variety of different forms, and can be configured to execute program instructions to perform tasks associated with operating robot 106, and moreover, to operate the robot 106 to perform various functions, such as, for example, but not limited to, tasks described herein.

In one form, the controller(s) 112 is/are microprocessor based and the program instructions are in the form of software stored in one or more memories. Alternatively, one or more of the controllers 112 and the program instructions executed thereby can be in the form of any combination of software, firmware and hardware, including state machines, and can reflect the output of discreet devices and/or integrated circuits, which may be co-located at a particular location or distributed across more than one location, including any digital and/or analog devices configured to achieve the same or similar results as a processor-based controller executing software or firmware based instructions. Operations, instructions, and/or commands determined and/or transmitted from the controller 112 can be based on one or more models stored in non-transient computer readable media in a controller 112, other computer, and/or memory that is accessible or in electrical communication with the controller 112. Further, according to certain embodiments, the controller 112 can be configured to dynamically control the movement of both the robot 106 itself, as well as the movement of other devices to which the robot 106 is mounted or coupled, and which can further displace or move the robot about at least a portions of the robot station 102, and thereby dynamically control at least the movement of the robot 106.

According to the illustrated embodiment, the controller 112 includes a data interface that can accept motion commands and provide actual motion data. For example, according to certain embodiments, the controller 112 can be communicatively coupled to a pendant, such as, for example, a teach pendant, that can be used to control at least certain operations of the robot 106 and/or the end effector 108.

The robot station 102 can also include at least a first perception system 114 comprising one or more perception devices 114a that can be used in connection with observing the robot station 102. For example, according to certain embodiments, the perception system 114 can be configured to attain and/or provide information regarding at least one or more aspects relating to the operation or status of the robot 106 and/or components in a picking bin, if any, on which the robot 106 and/or end effector 108 are, or will be, engaging, among other information relating to other aspects in or around the robotic station 102. Additionally, according to certain embodiments, the first perception system 114 can also be used to attain and/or determine information regarding other systems or components that may operate in connection with, and/or around, the robot station 102, including, for example, information regarding an associated supply conveyor(s), induction conveyor(s), and/or sorter conveyor, as discussed below. Additionally, as discussed below, the first perception system 114 can output information, or provide information that can be extracted by other components or devices of the robotic system 100, that can be used in connection with identifying or inferring the identify and/or quantity of elements or features within the scene, including, for example, information used in identifying the presence and/or absence of components, as well as the component's associated position(s) and/or orientation, within a picking bin and/or on an induction conveyor.

According to certain embodiments, data or information outputted by the first perception system 114 can be utilized by the controller 112 to control the operation of the robot 106. Moreover, according to certain embodiments, the first perception system 114 can have data processing capabilities that can process data or information obtained from the perception devices 114a that can be communicated to the controller 112. Alternatively, according to certain embodiments, the first perception system 114 may not have data processing capabilities and can be electrically coupled to a computational member 116 of the robot station 102 that is adapted to process data or information outputted from the first perception system 114. Additionally, according to certain embodiments, the first perception system 114 can be operably coupled to a communication network or link 118, such that information outputted by the perception system 114 and processed by a controller 120 and/or a computational member 124 of a management system 104.

Examples of perception devices 114a of the first perception system 114 can include, but are not limited to, one or more imaging capturing devices, such as, for example, one or more two-dimensional, three-dimensional, and/or RGB cameras that can be mounted within the robot station 102, including, for example, mounted generally above the working area of the robot 106, the picking bin 132, and/or on the end effector 108 of the robot 106, among other locations. The first perception system 114 can also include a variety of other perception devices, such as, for example, one or more motion sensors, depth sensors, and/or force sensors, among other types of devices.

Additionally, according to certain embodiments, the robotic singulation system 130 can also include a second perception system 115 that is adapted to capture and/or detect information or data relating to at least the induction conveyor 136, including, for example, information that provides an indication of whether a component(s) 144 has placed on the induction conveyor 144 by the robot 106, as well as other information regarding such placement. The second perception system 115 can include one or more perception devices 115a that are similar or dissimilar to the perception device(s) 114a of the first perception system 114, including, for example, one or more two-dimensional, three-dimensional, and/or RGB cameras, motion sensors, depth sensors, and/or force sensors, among other types of devices. Further, similar to the first perception system 114, the information or data obtained by the second perception system 115 can be evaluated and/or analyzed by the second perception system 115, and/or provided to, for example, the controller(s) 112, 120, the computational member(s) 116, 124, and/or the supplemental databases 105 for analysis. While the illustrated embodiment in discussed in terms of first and second perception systems 114, 115, according to other embodiments, the first and second perception system 114 can be part of the same perception system.

According to the exemplary embodiment depicted in FIG. 4, the management system 104 can include at least one controller 120, database 122, computational member 124, and/or one or more input/output (I/O) devices 126. According to certain embodiments, the management system 104 can be configured to provide an operator direct control of the robot 106, as well as to provide at least certain programming or other information to the robot station 102 and/or for the operation of the robot 106. Moreover, the management system 104 can be structured to receive commands or other input information from an operator of the robot station 102 or of the management system 104, including, for example, via commands generated via operation or selective engagement of/with an input/output device 126, including, but not limited to, commands provided through the engagement or use of a microphone, keyboard, touch screen, joystick, stylus-type device, and/or a sensing device that can be operated, manipulated, and/or moved by the operator, among other input/output devices. Further, according to certain embodiments, the input/output device 126 can include one or more monitors and/or displays that can provide information to the operator, including, for, example, information relating to commands or instructions provided by the operator of the management system 104, received/transmitted from/to the supplemental database system(s) 105 and/or the robot station 102, and/or notifications generated while the robot 102 is running (or attempting to run) a program or process. For example, according to certain embodiments, the input/output device 126 can display images, whether actual or virtual, as obtained, for example, via use of at least the perception device(s) 114a, 115a of the perception system(s) 114, 115.

According to certain embodiments, the management system 104 can include any type of computing device having a controller 120, such as, for example, a laptop, desktop computer, personal computer, programmable logic controller (PLC), or a mobile electronic device, among other computing devices, that includes a memory and a processor sufficient in size and operation to store and manipulate a database 122 and one or more applications for at least communicating with the robot station 102 via the communication network or link 118. In certain embodiments, the management system 104 can include a connecting device that may communicate with the communication network or link 118 and/or robot station 102 via an Ethernet WAN/LAN connection, among other types of connections. In certain other embodiments, the management system 104 can include a web server, or web portal, and can using the communication network or link 118 to communicate with the robot station 102 and/or the supplemental database system(s) 105 via the internet.

The management system 104 can be located at a variety of locations relative to the robot station 102. For example, the management system 104 can be in the same area as the robot station 102, the same room, a neighboring room, same building, same plant location, or, alternatively, at a remote location, relative to the robot station 102. Similarly, the supplemental database system(s) 105, if any, can also be located at a variety of locations relative to the robot station 102 and/or relative to the management system 104. Thus, the communication network or link 118 can be structured, at least in part, based on the physical distances, if any, between the locations of the robot station 102, management system 104, and/or supplemental database system(s) 105. According to the illustrated embodiment, the communication network or link 118 comprises one or more communication links 128 (Comm link$_{1-N}$ in FIG. 4). Additionally, the system 100 can be operated to maintain a relatively reliable real-time communication link, via use of the communication network or link 118, between the robot station 102, management system 104, and/or supplemental database system(s) 105. Thus, according to certain embodiments, the system 100 can change parameters of the communication link 128, including, for example, the selection of the utilized communication links 128, based on the currently available data rate and/or transmission time of the communication links 128.

The communication network or link 118 can be structured in a variety of different manners. For example, the communication network or link 118 between the robot station 102, management system 104, and/or supplemental database system(s) 105 can be realized through the use of one or more of a variety of different types of communication technologies, including, but not limited to, via the use of fiber-optic, radio, cable, or wireless based technologies on similar or different types and layers of data protocols. For example, according to certain embodiments, the communication network or link 118 can utilize an Ethernet installation(s) with wireless local area network (WLAN), local area network (LAN), cellular data network, Bluetooth, ZigBee, point-to-point radio systems, laser-optical systems, and/or satellite communication links, among other wireless industrial links or communication protocols.

The database 122 of the management system 104 and/or one or more databases 128 of the supplemental database system(s) 105 can include a variety of information that may be used in the identification of elements within the scene in which the robot 106 is operating. Moreover, as discussed below in more detail, one or more of the databases 122, 128 can include or store information that is used in the interpretation or deciphering of images or other information detected by the perception systems 114, 115. Such information in the databases 122, 128 can be used in at least attempting to identify elements or components within and/or around a scene, including, for example, components that are delivered to and/or within a picking bin in the robot station 102 and/or distinguishing such components from other elements or features within or around the robot station 102. Such determinations can, for example, at least assist in the determining whether any components are within a picking bin and/or whether the robot 106 can successfully pick or remove any of those components from the picking bin. Further, according to certain embodiments, the database 122 of the management system 104 and/or the supplemental database may be used in connection with identifying from information provided by one or more of the perception systems 114, 115 characteristics of the components that are being delivered to the robot station 102 and/or received in the picking bin. For example, the database 122 may provide characteristics of such components based on recognizing or identifying information relating to a bar code or other identifier detected by one or more of the perception systems 114, 115 on a tote used to deliver the components for the robot station 102, among other manners of identification. The database 122 of the management system 104 and/or one or more databases 128 of the supplemental database system(s) 105 can also include information that can assist in discerning other features within the robot station 102, such as, for example, scratches, labels, stickers, wear, and/or permanent changes in the robot station 102 or surrounding environment from other features within the robot station 102, including, for example, components within the picking bin that are captured by images attained by the perception devices 114*a*, 115*a* of one or more of the perception systems 114, 115.

FIGS. 5 and 6 illustrate schematic representations of at least portions of an exemplary robotic singulation system 130 that can employ the robotic system 100 depicted in FIG. 4. While for at least purposes of illustration, the exemplary robotic singulation system 130 depicted in FIGS. 5 and 6 is shown as having, or being in proximity to, certain elements arranged in the illustrated manner, the robotic singulation system 130 can have a variety of other arrangements and elements.

In the illustrated example, the robotic singulation system 130 includes at least one robot station 102. According to certain embodiments, the robotic singulation system 130 may, or may not, also include the management system 104 and the supplemental database system(s) 105. The depicted robotic singulation system 130 shown in FIG. 5 also includes at least one picking bin 132. While, for at least purposes of illustration, FIGS. 5 and 6 illustrate only a single picking bin 132, according to other embodiments, the robot station 102 of the robotic singulation system 130 can have a plurality of picking bins, which may, or may not, have variety of different components and/or purposes. Further, the picking bin 132 can be sized and/or shaped to contain a variety of components delivered to the picking bin 132, including, for example a variety of components received by the picking bin 132 from a variety of different totes, as discussed below. Such structure can include, for example, the picking bins 132 having sloped walls or walls with radiuses that can at least assist in configuring the picking bin 132 to be large enough to contain a full tote of any item.

The illustrated robotic singulation system 130 can also include, or by operated in connection with, one or more supply lines or conveyors 134, one or more induction conveyors 136, and/or one or more sorter conveyors 166. According to the illustrated embodiment, the supply conveyor 134 can be positioned and operated relative to the one or more robot stations 102 so as to transport components 144 for placement in the one or more picking bins 132 of the robot station 102. Similarly, the one or more induction conveyors 136 can be positioned and operated relative to the one or more robot stations 102 so as to facilitate placement by the robot 106 of components 144 from the one or more picking bins 132 onto the induction conveyor 136. Further, the sorter conveyor 166 can be positioned to receive the transfer the components 144 at one or more pre-selected sorter positions 138, among a plurality of sorter positions 140 on the sorter conveyor 166. Such pre-selected sorter positions 138 can, for example, relate to, in at least certain systems 130 or operations, the particular location at which a particular component 144 from the induction conveyor 136 is to be placed or positioned on the sorter conveyor 166. Such designation of a particular sorter position(s) 140 as a pre-selected sorter position(s) 138 can, for example, in at least certain operations, be coordinated with downstream handling, sorting, and/or processing of that particular component 144 as opposed to, or in coordination with, the downstream handling, sorting, and/or processing of other, different components 145a-c that may occupy other sorter positions 140 on the sorter conveyor 166. However, according to certain operations, each of the sorter positions 140 can be designated as a pre-selected sorter position 138 for the component 144.

A variety of different types of conveyors or conveyor systems can be employed as the supply conveyor 134. For example, the supply conveyor 134 can include one or more powered conveyor belts and/or powered roller conveyors that can transport components 144 for delivery to, or in general proximity of, the robot station 102. For example, according to the illustrated embodiment, the supply conveyor 134 comprises one or more conveyor belts 142 that are driven via an operable coupling to one or more motors and/or pulleys. Further, while components 144 for delivery to the robot station 102 via, at least in part, use of the supply conveyor 142 can be placed directly on the supply conveyor 142, in the illustrated embodiment, the components 144 are transported along the supply conveyor 134 in a tote or container 146. According to such embodiments, the components 144 may be manually or automatically loaded or placed into the tote 146 upstream of the robot station 102.

While the tote 146 can have a variety of different shapes or sizes, according to the illustrated embodiment, the tote 146 has a plurality of sidewalls 148. At least a portion of the sidewalls 148 can generally define on or more openings 150 (FIG. 5) in the tote 146 through which the components 144 can be loaded and subsequently unloaded or removed from the tote 146. For at least purposes of illustration, according to the exemplary tote 146, the opening 150 can be positioned at a top end 152 of the tote 146, as depicted in FIGS. 5 and 6.

The transfer for components 144 from the tote 146 to the picking bin 132 can be achieved in a variety of different manners. For example, according to the illustrated embodiment, the tote 146 can be manipulated, such as, for example, rotated and/or tilted, such that the components 144 therein can flow, such as, for example, via at least in part the influence of gravitational forces, from the tote 146 and to or toward the picking bin 132. Such manipulation of the tote 146 in the transfer of components 144 to the picking bin 132 can also include displacement in the relative position of the tote 146 and/or the picking bin 132. For example, according to the depicted embodiment, the supply conveyor 134 and/or the robotic singulation system 130 can include a dump system 154 that is configured to engage the tote 146 in a manner that facilitates at least the rotating or tilting the tote 146 from a first position on the supply conveyor 134 (as demonstrated by the tote 146 shown by broken lines in FIG. 6) to a second position (as demonstrated by the tote 146 shown by solid lines in FIG. 6) at which the opening(s) 150 of the tote 146 is an orientation at which components 144 can slide from, or otherwise leave, the tote 146. According to such an embodiment, a bracket or other engagement member 156 of the dump system 154 can be structured to engage an outer surface or other feature of the tote 146, including, for example, one or more of the sidewalls 148, a bottom wall 149, a projection, and/or a handle of the tote 146. With the bracket 156 operably engaged or coupled to the tote 146, a pneumatic or hydraulic cylinder or lift 158 of the dump system 154 can be operated in a manner that facilitates at least the partial rotational or pivotal displacement of the tote 146 about the dump system 154 so that the opening 150 of the tote 154 is positioned to facilitate removal of the components from within the tote 146. However, the removal of components 144 from the tote 148 can also be achieved in a variety of other manners. For example, according to other embodiments, one or more pneumatic or hydraulic cylinders or lifts, among other mechanisms, can engage the bottom wall 149 and/or sidewall 148 of the tote 146 in a manner that facilitates the tipping of the tote 146 in a manner that positions the tote 146 at an orientation that facilitates removal of the components 144 within the tote 146 for delivery to the picking bin 132, which can also be further enhanced by the orientation of the supply conveyor 134 in the area in which the tote 146 is tipped.

Additionally, according to certain embodiments, the system 130 can also verify that the tote 146 has been emptied. Such verification can, according to certain embodiments, occur when the tote 146 is at, or between, a variety of different positions. For example, according to certain embodiments, such verification can occur when the tote 146 is returned to the above-discussed first position, while the tote 146 is at the second, dump position, and/or at position(s) there-between, among other positions. Further, such verification can occur in a variety of different manners. For example, according to certain embodiments, the end effector 108 of the robot 106 can follow a fixed path, including a fixed path within the tote 146, to confirm the presence or absence of any remaining components 144 within the tote 146. Such verification could occur, for example, by the robot 106 and/or any associated sensing device, detecting an impact by the robot 106 and/or end effector 108 with any component 144 that may be positioned along the path taken by the robot 106. Additionally, the end effector 108 used by the robot 106 to detect the presence of any remaining components 144 in the tote may, or may not, be different than the end effector 108 utilized by the robot 106 to pick or remove components 144 from the picking bin 132. Alternatively, according to certain embodiments, the first perception system 114 can capture a tote image of the tote 146, which can be analyzed to determine the presence of any remaining components 144 within the tote 146. According to certain embodiment, the captured tote image can be compared to a captured reference tote image(s) of that tote 146 or another similar tote that is known to not contain any components 144. According to such embodiments, differences, if any, between the tote image and the reference tote image can provide information used, such as, for example, by the first perception system 114, the controller(s) 112, 120, and/or the computational member(s) 116, 124, to determine the presence of the any components 144 within the tote 146.

As shown in FIGS. 5 and 6, according to certain embodiments, the transfer of components 144 from the tote 146 to the picking bin 132 can be aided by the inclusion of a chute, channel, and/or funnel 160. According to such an embodiment, the chute 160 can extend between at least a portion of the area between the tote 146 and the picking bin 132. Further, the chute 160 can be structured to provide support, as well as direct the direction of travel, of the components 144 as the components 144 are displaced from the tote 146 and to the picking bin 132. According to certain embodiments, the chute 160 can be provided by least a portion of the dump system 154, such as, for example, by a portion of the bracket 156. Further, according to certain embodiments, in at least an attempt to facilitate the removal of components 144 from the tote 146 during the dumping process, and/or to prevent components 144 from remaining in the tote 146 after the tote 144 was to be emptied, the tote 146 can be subjected to agitation forces that can facilitate the removal of components 144 from the tote 146. For example, according to certain embodiments, the lift 158 of the dump system 154 can subject to the tote 146 to a plurality of relatively rapid rises and drops, among movement in other directions, that may cause displacement of any remaining components 144 relative to the tote 146, and thus facilitate those components 144 coming out of the tote 146. According to other embodiments, the robot 106 can operably engage the tote 146 in a manner that facilitates the agitation of the tote 146, and thus the relative movement of any components 144 within the tote 146. For example, the below discussed engagement body 162 (FIG. 6), such as, for example, a hook, can engage or otherwise be coupled to the tote 146 in a manner that can at least assist in transferring forces and/or movements from the robot 106 to the tote 146 that can cause such agitation of the tote 146 and the associated relative displacement of the components 144 therein.

Similar to the supply conveyor 134, the induction conveyor 136 can take a variety of forms. In the illustrated embodiment, the induction conveyor 136 includes a belt 162 that can be driven in a variety of different manners, such as, for example, by one or more electrical, hydraulic, and/or pneumatic motors. The induction conveyor 136 can also include a plurality of sensors and/or a controller (not shown) that can at least control the speed and timing at which the belt 162 operates and/or at which components 144 from the product bin 132 are placed on the induction conveyor 136. Further, according to certain embodiments, the transfer of components 144 from the induction conveyor 136 to the sorter conveyor 166 can be facilitated by a chute or funnel 168 that can provide a pathway for the components 144 between at least a portion of the induction and sorter conveyors 136, 166.

As also indicated by at least FIG. 5, the sorter conveyor 166 can be operated such that the components 144 transferred from the induction conveyor 136 are received at the pre-selected sorter position 138, among the other sorter positions 140, along a belt 170 of the sorter conveyor 166. Further, according to certain applications, the sorter belt 170 can be driven in a variety of manners, including, for example, by one or more motors. Further, as previously discussed, the sorter conveyor belt 170 can be operated at speeds that are similar or different than the speeds at which the belt 162 of the induction conveyor 136 operates, and/or may, or may not, experience different brakes in operation.

FIGS. 7A-7D illustrate a flow diagram of an exemplary process 200 for operation of a robotic singulation system 130 according to certain embodiments of the subject application. The operations illustrated for all of the processes in the present application are understood to be examples only, and operations may be combined or divided, and added or removed, as well as re-ordered in whole or in part, unless explicitly stated to the contrary.

At step 202, main electrical power can be provided for the robotic singulation system 130, which can include, for example, at least providing electrical power for the robot station 102, among other portions of the robotic singulation system 130. Accordingly, at step 204, the controller 102 of the robot 106 can be powered on. Optionally, according to certain embodiments, in connection with the powering on of the robot controller 112, at step 206 verification may also be made to confirm that the perception system(s) 114, 115 is/are also powered on. Such verification as to the power on status of the perception system(s) 114, 115 can be attained in a variety of manners, including, visual inspection by an operator of components of the perception system(s) 114, 115 and/or the perception system(s) 114, 115 undergoing an automatic test procedure, among other manners of verification. Additionally, the teach pendant can also be used to verify stages of readiness for the system 130. According to certain embodiments, the teach pendant of the robot can act as a human-machine interface (HMI), or a separate HMI could be provided to enunciate status of components of at least the robot station 102, including, for example the status of the perception system(s) 114, 115, a vision system(s), controller(s), a safety system(s), and/or conveyors 134, 136, 166, as well as enunciate the estop status, induction conveyor 136 status, communication status with requests for a tote(s) 146 and/or the sorter conveyor 166.

At step 208, a check can be performed to determine the presence of any components 144 in the picking bin 132 and/or on the induction conveyor 136, and if components 144 are present, those components 144 can be cleared. According to certain embodiments, such checking can be performed via a visual inspection of an operator of the robot station 102, particularly in the absence of background images to can be evaluated compared to images that can capture the current scene or environment. Further, any detected components 144 can be either manually removal by the operator or removed via operation of the robot 106 and associated end effector 108. Optionally, according to certain embodiments, the presence of such components 144, if any, in the picking bin 132 and/or on the induction conveyor 136 can be determined by operation of the perception system(s) 114, 115, which can capture images that can provide information be used to determine the presence of any such components 144, if any, in the picking bin 132 and/or on the induction conveyor 136, as discussed below. Additionally, according to certain embodiments, sensors, such as, for example, photo eyes, on the induction conveyor 136 could also provide an indication of the presence of components 144 on the induction conveyor 136. According to such embodiments, upon detection by such sensors of the presence of a component 144, the belt 162 of the induction conveyor 136 could be operated in a reverse direction so that the component 144 can be moved to a location at which the component 144 could be removed by the robot 106 and/or an operator.

At step 210, verification can be made as to a mode of operation of the robot 106. For example, at step 210, verification can be made by an operator of the robot 106 that the robot 106 is an automatic, or "AUTO", mode of operation, such that the robot 106 can run stored programs at full speed. With the robot 106 in the "AUTO" mode, at step 212 the operator can input a start command, such as, for example, press a "START" button on a teaching pendant, to initiate the running of at least certain portions or aspects of the program used by the robot 106, among other components, to begin operation of components of the robotic singulation system 130 and/or the robot 106, including, for example, certain operations of the process 200 discussed herein.

Figure 7A:
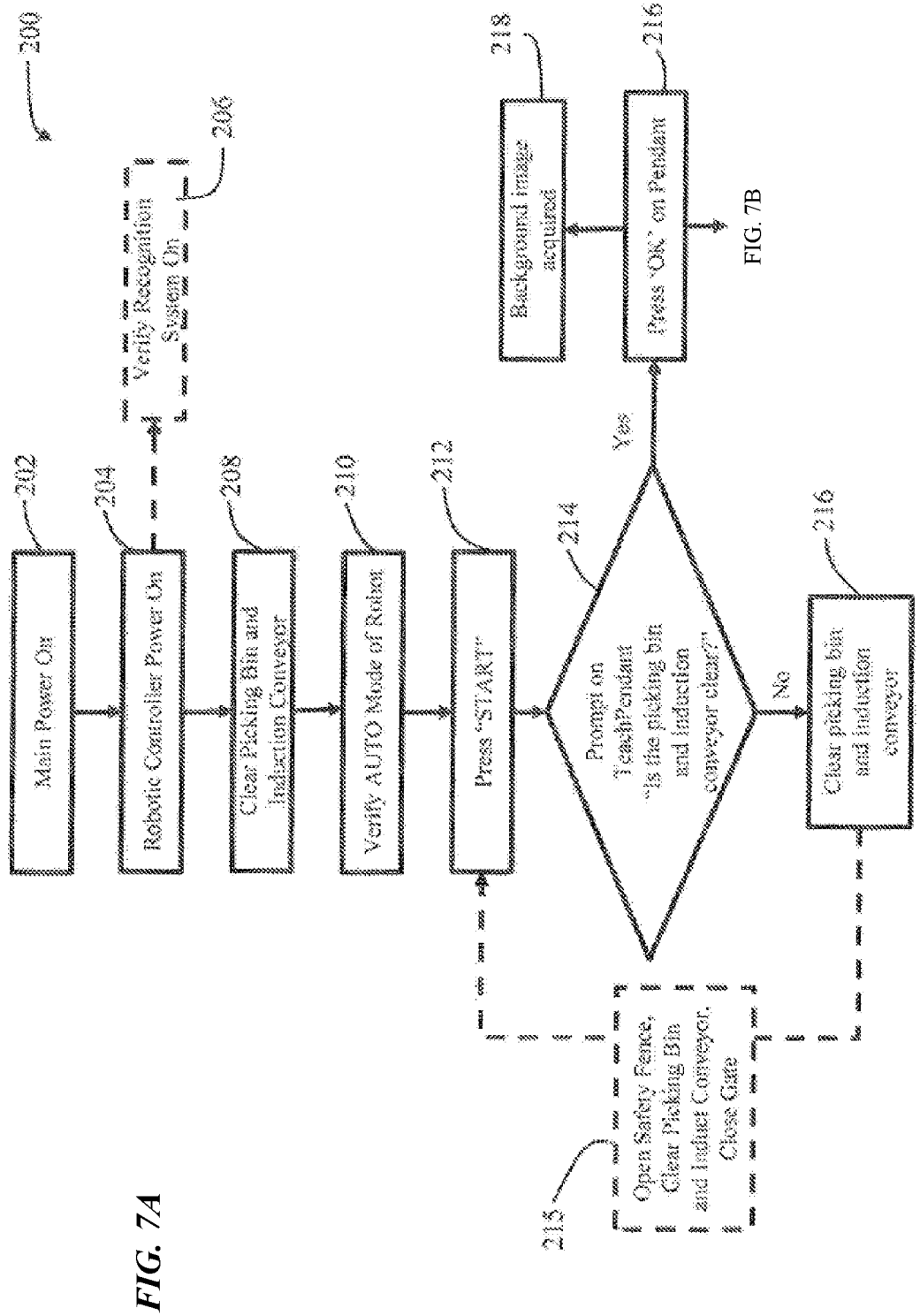

At step 214, an inquiry can be provided to the operator of the robot 102 to confirm that picking bin 132 and/or the induction conveyor 136 are clear of components 144. If the picking bin 132 and/or at least the selected spaces 138 on the induction conveyor 136 are not clear of components 144, then at step 216, any components 144 may be removed or cleared from the picking bin 132 and/or the induction conveyor 136. As indicated by FIG. 7A, the step of removing or clearing these remaining components at step 216 can include, at step 215, the opening of a safety fence or gate so as to gain access to the components 144 that are to be cleared, followed by subsequent re-closing of the safety fence or gate.

If however the response to the inquiry at step 214 is that the picking bin 132 and/or the induction conveyor 136 are clear of components 144, then at step 214 the operator can input a "yes" response, or similar response, to the inquiry, such as, for example, by inputting an affirmative response on the teaching pendant or other HMI. Further, according to certain embodiments, the inquiry at step 214 can also seek to confirm that the robot 106 is in the home position. At step 218, using at least the first and second recognition systems 114, 115 the robotic singulation system 130 may acquire one or more background image(s) of at least portions of the scene of, or around, at least a portion the robot station 102 and/or the induction conveyor 136. Such a background image(s) can be used to at least assist in later differentiating information on subsequent images captured by the perception system(s) 114, 115 that correspond to at least the presence of components 144 from information that corresponds to other elements or features of, or around, at least a portion the robot station 102 and/or the induction conveyor 136. For example, the perception device(s) 114a of the first perception system 114 can detect, capture, and/or otherwise attain images or information regarding features of elements within the robotic singulation system 130 at or around at least the picking bin 132, the chute 160, and/or the dump system 154, including, for example, information regarding the structure of those items, as well as other characteristics, including for example, scratches, stickers, and/or labels. Similarly, the perception device(s) 115a of the second perception system 115 can detect, capture, and/or otherwise attain images or information regarding features of elements within the robotic singulation system 130 at or around at least the induction conveyor 136, including, for example, information regarding the structure of the induction conveyor 136 and the adjacent environment or scene, as well as other characteristics of or around the induction conveyor 136. According to certain embodiments, information and/or data obtained from the background image(s) by the first and second perception systems 114, 115 can be evaluated and/or analyzed by the first perception system 114 and/or the second perception system 115. Further, the background image(s) and/or the results of any analysis of the background image(s) captured by the first and/or second perceptions systems 114, 115 can be provided to, for example, the controller(s) 112, 120 the computational member(s) 116, 124, and/or the supplemental databases 105.

Figure 7B:
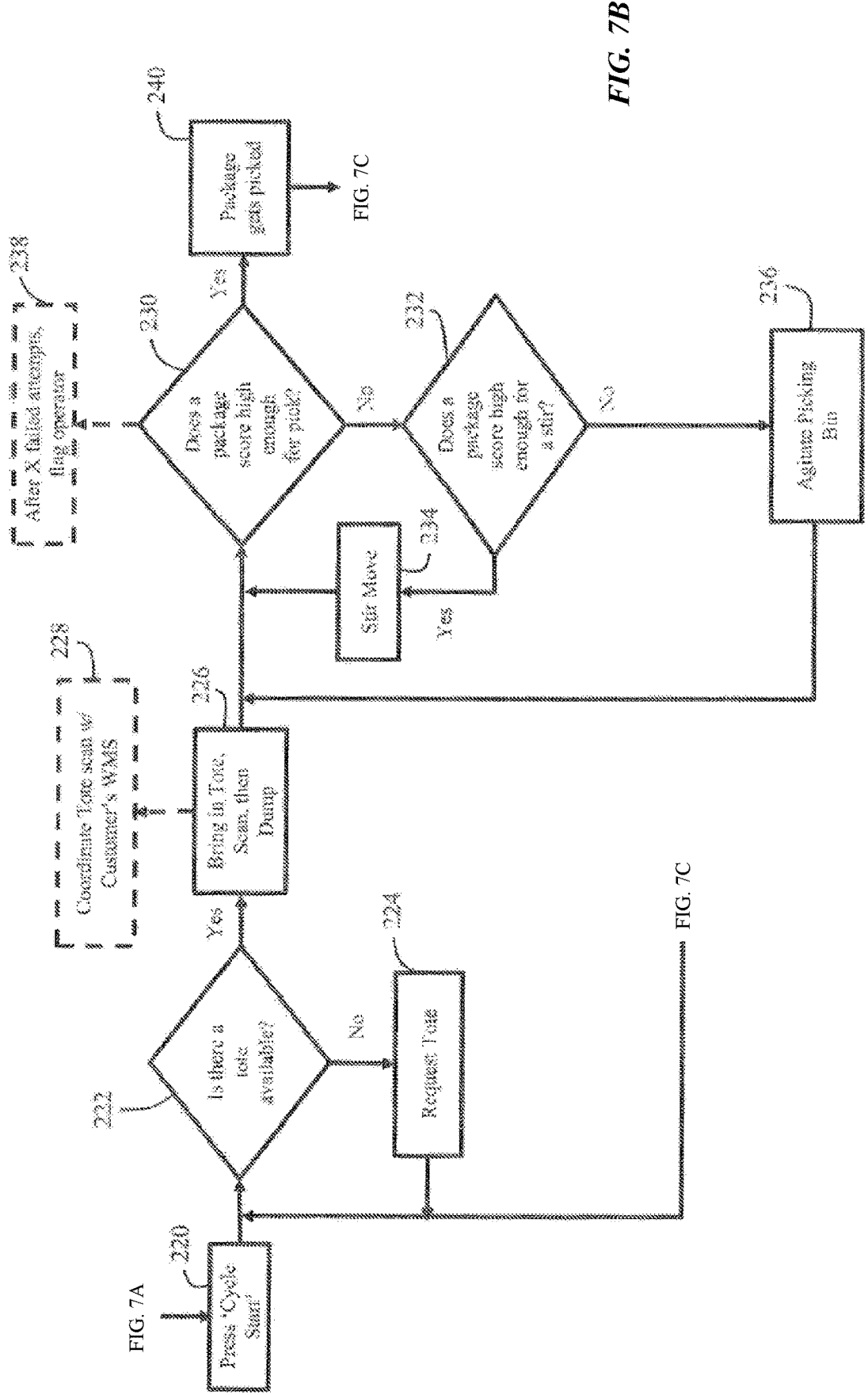

As continued on FIG. 7B, according to certain embodiments, at step 220 the operator can input a command or response, such as, for example, by inputting a "Cycle Start" command using the teaching pendant, to being a cycle of operation of the at least the robot 106. At step 222, an inquiry can be made as to whether a tote 146 is available for delivery of components 144 to the picking bin 132. If, in response to the inquiry at step 222, a tote 146 is determined not to be ready, then at step 224, a request is made, such as, for example, via a communication from the computational member 116 to the management system 104, that a tote 146 be prepared and made available for delivery of components 144 to the picking bin 132. When a tote 146 is available, or becomes available, then at step 226 the tote 146 is delivered generally to the robot station 102, such as, for example, along the supply conveyor 134 to a location where components 144 therein can be supplied to the picking bin 132. The delivery of the tote 146 can also include a detection of information pertaining to the tote 146 and/or the components 144 therein. For example, the tote 146 can include a product identifier, including, for example, a bar code, SKU, or RFID device, among other identifiers, that can be read or detected, such as, for example, by use of the first perception system 114, which provides information indicating the type and/or quantity of components 144 contain within the tote 146. According to certain embodiments, after the product identifier of the tote 146 is read and/or detected, the product identifier is used to locate information in the management system 104 and/or supplemental databases 105 to attain information relating to the components 144 that are within the tote 146. Additionally, at step 228, information attained for the tote 146 regarding the components 144 contained therein can also be communication to, or received from, another party's warehouse management system (WMS), which can be provided to the WMS for at least inventory and/or production related purposes.

Further, at step 226, according to certain embodiments, the tote 146 can be tilted, rotated, or otherwise manipulated so that the components 144 contained therein are dispensed from the tote 146 for delivery to the picking bin 132. For example, as previously discussed, according to certain embodiments, the tote 146 can be tilted, rotated, or otherwise manipulate by a dump system 154, among other devices or mechanisms, so that an opening 150 of tote 146 and the tote 146 itself are positioned for components 144 therein to travel out, or otherwise be removed, from the tote 146. Additionally, as previously discussed, according to certain embodiments, the components 144 removed from the tote 146 can travel along the chute 160 before being delivered to the picking bin 132. Further, as previously discussed, according to certain embodiments, the tote 146 can be agitated so as to facilitate the removal of any components 144 that did not exit the tote 146. As also discussed, according to certain embodiments, the system 130 can also verify that the tote 146 has been emptied, such as, for example, through the use of the perception system 114 and/or by an end effector 108 of the robot 106 traveling along a fixed path within at least a portion of the tote 106, among other manners of verification.

According to certain embodiments, after components 144 have been transferred from the tote 146 and to the picking pin 132, the return of the tote 146 to the previously discussed first position, as shown for example by the tote 146 that is depicted with broken lines in FIG. 6, by the dump system 154 can result in robot 106 being signaled to begin a cycle of operation. Thus, for example, according to certain embodiments, with the components 144 transferred to the picking bin 132 and the tote 146 returned to the first position, at step 230 a determination is made as to whether one or more components 144 within the picking bin 132 cab be picked by the robot 106 so as to be removed from the picking bin 132.

According to certain embodiments, the determination of whether a component 144 can be picked from the picking bin 132 by the robot 106 can be determined through a determination of a current picking score and a decision of whether that determined pick score satisfies a threshold picking score. The threshold pick score can provide, or be based on, an indicator of whether the robot 106 can successfully remove at least one component 144. According to certain embodiments, such a determination may not only include whether the robot 106 can successfully pick a component 144 from the picking bin 132, but also whether the robot 106 can then successfully place the picked component on the induction conveyor 136. Thus, the threshold pick score can be based on several factors that may influence the success of at least the robot 106 to pick the component 144 from the picking bin 132, including, for example, the position, orientation, and/or accessibility of the component 144 within the picking bin 132 and/or relative to the robot 106, among other factors.

For example, according to certain embodiments, at step 230, one or more perception devices 114a of the first perception system 114 can capture an image(s), or component image, or other information relating to the components 144 that are in the picking bin 132. The component image(s) can then be compared or evaluated in connection with the information and/or data provided by or from the background image(s) that were obtained at step 218. Such an evaluation or comparison of the component image(s) and the background image(s) that were taken when at least the picking bin 132 was cleared of components 144 can assist in distinguishing or detecting the information or data in or from the component image(s) that corresponds to a component(s) 144 from other information or data that corresponds to other features or elements in the picking bin 132 and/or the induction conveyor 136, among other elements within the robot station 102 or associated scene. Such an evaluation can be performed by a variety of components of the robotic singulation, system 130, including, for example, by the first perception system 114, and/or any of the controllers 112, 120 or the computational member(s) 116, 124 of either or both the robot station 102 and the management system 104.

The distinguishing or detecting of features captured in a component image(s) that correspond to components 144 from other features in the component image(s) can be achieved in a variety of manners. For example, according to certain embodiments, the information or data provided by or from the background image(s) can be subtracted from the information or data provided by or from the component image(s). According to such embodiments, such subtraction can be used to generate a score, value, or rating that can be expressed in a quantitative and/or qualitative manner that can be used to evaluate at least the presence of components 144 in the captured image(s), as well as features regarding those captured images, such as, for example, their location and/or orientation. For example, according to certain embodiments, the result of such subtraction can assist in identifying the coordinates corresponding to the location of one or more components 144 in the picking bin 132. Further, information of obtained of the one or more components in the picking bin 132, as well as an identification of the characteristics of the components 144, such as, for example, physical characteristics obtain information received at step 226, can be used to determine a relative orientation of the component 144, such as, for example, an orientation relative to the robot 106. Such information can be complied for each detected component 144 and contribute to arriving at a determined pick score for that particular component 144 that can provide an indication of whether the robot 106 can pick, or likelihood of success if an attempt is made to pick, the component 144 from the picking bin 132. According to such an embodiment, the robot 106 may not attempt to grasp or pick any component 144 from the picking bin 132 unless the determined pick score at least meets, exceeds, or otherwise satisfies a threshold pick score. Such an evaluation of the likelihood of success, including the determination and evaluation of a determined pick score can be performed by a variety of components of the robotic singulation system 130, including, for example, by the first perception system 114, the computational member 116 of robot station 102, and/or the computational member of management system 104, among other components of the system 130.

As shown in FIG. 7B, according to the illustrated embodiment, if at step 230 a determination is made that the robot 106 will be unable to pick any components 144 from the picking bin 132, such as, for example, the determined pick score for each of the components 144 does not satisfy the threshold pick score, then at step 232 the system 130 can evaluate whether the determined pick score of any of the components 144 satisfy a threshold stir score. According to such an embodiment, the threshold stir score is lower than the threshold pick score. Moreover, according to certain embodiments, a component 144 that is identified as having the highest determined pick score, but which does not satisfy the threshold pick score, can be selected for a "stir". According to such an embodiment, the robot 106 can attempt to grasp that component 144, and retract the component 144 from its pick position. Further, the robot 106 can rotate about at least some of the robot's 106 axes in a manner that at least attempts to position the grasped component 144 at a location and/or orientation within the picking bin 132 that presents an alternative surface of the targeted component 144 to the perception system 114 for subsequent evaluation in connection with a subsequent captured component image and a subsequent determined, or reevaluated, pick score for that component 144.

Alternatively, according to certain embodiments, if the determined pick score satisfies the threshold stir score, such as, for example, is larger or greater than the threshold stir score but less or lower than the threshold pick score, then at step 234, the contents within the picking bin 132, namely the components 144 contained therein, can be stirred. For example, according to certain embodiments, a portion of the end effector 108 of the robot 106 may enter into an inner region of the picking bin 132 and move along a fixed path, or, alternatively, in a non-random motion, in a manner that facilitates contact between the end effector 108 and at least some of the components 144 therein so as to cause an change in the position and/or orientation of at least some of the components 144 within the picking bin 132. Alternatively, according to other embodiments, the end effector 108 can grasp another object, such as, for example, a paddle, among other objects, that the robot 106 can use to at least attempt to contact components 144 within picking bin 132 in a manner that can adjust the location and/or orientation of one or more components 144 within the picking bin 132.

Upon completion of the stir, the process can return to step 230, whereupon the first perception system 114 can capture another component image(s) that can be evaluated in connection the reevaluating whether the robot 106 can pick a component 144 from the picking bin 132 and/or the likelihood of success of an attempt at such a pick. According to the illustrated embodiment, this reevaluation can include determining another determined, or reevaluated, pick score using the background image(s) from step 218 in a manner similar that is similar to that discussed above with respect to the initial determined pick score. A determination can be made at step 230 as to whether the determined, or reevaluated, pick score generated following the stirring at step 234 satisfies the threshold pick score, or, if the threshold pick score is not satisfied, whether additional stirring or agitation of the picking bin 132 is to be performed before again revaluating whether the robot 106 can, or would likely succeed in attempting to, pick a component 144 from the picking bin 132.

If, however, at step 232 the determined pick score does not satisfy the threshold stir score, then at step 236 the picking bin 132 can be agitated, shaken, or otherwise disrupted in a manner that can facilitate movement of the components 144 therein. Such agitation of the picking bin 132 can at least attempt to adjust a location and/or orientation of the components 144 relative to the picking bin 132. The picking bin 132 can be agitated in a variety of different manners. For example, as shown in FIG. 6, according to certain embodiments, the robot 106 can include an engagement body 162, such as, for example, a hook, that can engage the picking bin 132, or feature that is coupled to the picking bin 132, such as, for example, an eyehole, in a manner that can allow movement of the robot 106 to be transferred to the picking bin 132. According to such an embodiment, the robot 106 can be moved in a variety of different directions, and/or combinations of directions, in a manner that can facilitate movement of the components 144 relative to the picking bin 132. Alternatively, or additionally, one or more ancillary agitators that are not coupled to the robot 106 can be positioned and structured to facilitate agitation of the picking bin 132. For example, as shown in FIG. 6, an agitator 164 having a hydraulic or pneumatic lift or ram that can the picking bin 132 is positioned beneath the picking bin 132. According to certain embodiments, for example, operation of the agitator 164 can cause a portion of the picking bin 132 to be raised and then dropped, one or more times in a manner that can facilitate the movement of components 144 contained therein relative to the picking bin 132. However, the agitator 164, or a plurality of agitators 164 can be positioned at a variety of locations and be structured to facilitate movement of the picking bin 164 and the components 144 therein a variety of directions and/or manners. Further, according to certain embodiments, each of a plurality of agitators 164 can be operated in series of repeated operations, such as, for example, a series of relatively rapid intervals that can impart impact forces on the picking bin 132 that facilitates movement of components 144 therein.

Similar to after completion of the stirring discussed above with respect to step 234, following the agitation of the picking bin at step 236, the process can return to step 230, whereupon the first perception system 114 can capture another component image(s) that can be evaluated in comparison with the background image(s) from step 218 in determining another determined, or reevaluated, pick score. This updated determined, or reevaluated, pick score can be used in again determining at step 230 the ability of the robot 106, or its associated likelihood of success, to pick a component 144 from the picking bin 132.

Additionally, as shown in FIG. 7B, according to certain embodiments, a counter can be operated, or a recording in another form may occur, that tracks how many times the stirring of step 234 and/or the agitation of step 236 have occurred without successful satisfaction of the threshold pick score. In such situations, as shown by step 238, if the number of successive times that the components 144 have been stirred (step 234) and/or the picking bin 132 has been agitated (step 236) without the resulting determined, or reevaluated, pick scores satisfying the threshold pick score exceeds a threshold number, such as, for example, three, then a notification can be generated for the operator indicating the repeated inability to satisfy the threshold pick score. In response, the operator may examine the picking bin 132 and/or the components 144 contained within the picking bin 132 and/or manually adjust one or more of those components 144, in an attempt to identify and/or resolve any potential issues that may be causing such repeated failures. Alternatively, the operator can also at least attempt to resolve the issue through teleoperation of the robot 106.

If, or when, at step 230 it is determined that the robot 106 can pick a component 144 from the picking bin 132, such as, for example when a determined pick score is achieved that satisfies the threshold pick score, then, as shown on FIG. 7B, at step 240 the robot 106 is operated so that the end effector 106 grasps or otherwise picks that component 144 from the picking bin 132. Referencing FIG. 7C, at step 242, a determination is made as to whether the component 144 is to be placed in the induction conveyor 136. According to certain embodiments, the decision of whether to place the component 144 on the induction conveyor 136 can be based on a variety of factors, such as, for example, based on a determination that the induction conveyor 136 is empty. A determination of whether the induction conveyor 136 is empty can be based on whether any components 144 are currently positioned in the induction conveyor 136, which can be ascertained, for example, using information and/or data captured by the first or second perception systems 114, 115, and which can be evaluated in connection with a previously obtained background image of the induction conveyor 136 that captured at least the induction conveyor 136 without any components 144 on the conveyor 136.

If at step 242 a determination is made that the induction conveyor 136 is not empty, then at step 244 the current operation cycle of the robot 106 can be interrupted, and the robot 106 can continue to hold the grasped component 144 until the induction conveyor 136 becomes empty or clear. The induction conveyor 136 can become clear in a variety of manners, including, for example, by the induction conveyor 136 being advanced so that a component 144 that is on the induction conveyor can be transferred to a sorter position 138, 140 on the sorter conveyor 166.

At step 246, when the inductor conveyor 136 has been determined to be clear, the robot 106 can proceed with placing the grasped component 144 onto the inductor conveyor 136. At step 248, a determination can be made as to whether the component 144 is/was placed on the induction conveyor 136. According to certain embodiments, the determination of whether the component 144 is/was placed on the induction conveyor 136 can involve, at least in part, use of one or more to the background images that were attained at step 218 by at least the perception device 115a of the second perception system 115. Moreover, information from such a previously attained background image(s) can be subtracted from, or otherwise evaluated in connection with, a conveyor component image(s) that is taken of at least the area of the induction conveyor 136 in the vicinity of where the component 144 is believed to be positioned on the induction conveyor 136. The result of such an evaluation, including, for example, a resulting score attained by the subtraction of the associated background image(s) and the conveyor component image(s), can be used to at least attempt to verify the presence of the component 144 on the induction conveyor 136.

As shown by FIGS. 7B and 7C, according to certain embodiments, following a verification that the component 144 has been placed on the induction conveyor 136, the process can include reconfirming that a tote 146 is available, as discussed above with respect to step 222. Such a determination can, according to certain embodiments, be at least part of a proactive attempt to eliminate or minimize downtime between the supply of components 144 to the picking bin 132 and/or downtime in the operation of the system 130.

The conveyor component image obtained by the second perception system 115 when the component 144 is positioned on the induction conveyor 136 can also be used to ascertain a variety of other information that can be evaluated by the perception system 115, and/or by the controller(s) 112, 120 and/or computational member(s) 116, 124 of the robot or management systems 102, 104. Such information can include, but is not limited to, information used to execute a quality check(s) of the component 144. Such quality check(s) can include, for example, an identification or recognition of the presence or absence of any detected defects in the component 144. Further, as indicated by step 250 on FIG. 7C, according to certain embodiments, such a quality check can include determining the quantity of components 144 on the induction conveyor 136. Thus, for example, if only a single component 144 is to be placed on the induction conveyor 136, the quality check can include at step 138 a determination of whether more than one component 144 is on the induction conveyor 136. If the number of components 144 on the induction conveyor 136 is determined, through analysis of information provided by the second perception system 115, to be greater than or less than the number of components 144 that are to be on the induction conveyor 136, then at step 252, corrective action is taken. For example, if too many components 144 are on the induction conveyor 136, then the operation cycle can be interrupted, and the robot 106 can be instructed to remove the excess component(s) 144 from the induction conveyor 136. The robot 106 can then either return the excess component(s) 144 to the picking bin 132 or hold the excess component(s) 144 for subsequent placement on the induction conveyor 136. Alternatively, if one or more components 144 are to be added to the induction conveyor 136, then at step 252 the robot 106 can be operated to attain an additional component(s) 144 from the picking bin 132 and to place the component(s) 144 on the induction conveyor 136.

At step 254, a determination can be made as to whether action(s) taken at step 252 have resulted in the correct number of component(s) 144 being positioned on the induction conveyor 136. Such a determination can include the second perception system 115 capturing another conveyor component image(s) that can be evaluated again with respect to the same or another background image(s) that was used in a similar evaluation at step 250. If at step 254 a determination is made that further corrective action is required, then steps 252 and 254 may again be repeated. Further, a counter or additional tracking device or method can track the number of times that corrective actions taken at step 252 have been determined at step 254 to have failed to result in attaining a determination of the correct number of components being on the induction conveyor 136. If the number of attempted, but failed, corrective actions are determined at step 256 to exceed a predetermined number of attempts, such as, for example, three determinations at step 254 that the corrective actions of step 252 have failed to remedy the issue(s), then at step 256 a signal or other notification can be generated and provided to the operator of the robotic station 102 or the management system 104 that provides notification of the issue.

If at step 250 it is determined the correct number of components 144 are positioned on the induction conveyor 136, or at step 254 that the corrective action from step 252 has resulted in the correct number of components 144 being positioned on the induction conveyor 136, then the process 200 can proceed to another, different quality check. For example, according to certain embodiments, at step 258 a determination can be made as to whether the component 144 is placed on the induction conveyor 136 at a pre-selected or proper orientation, such as, for example, an orientation that can facilitate downstream handling and/or sorting of the component 144 and/or transfer of the component to a sorter position 138, 140 on the supply conveyor 166. According to certain embodiments, the determination of whether the component 144 is placed on the induction conveyor 136 at the proper orientation may, or may not, involve the use of the same conveyor component image(s) that was/were used in the preceding quality check in either steps 250 or 254 that resulted in a determination that the correct number of components 144 are on the induction conveyor 136. The result of such an evaluation can be used to at least attempt to verify that the component 144 is, or is not, in the proper orientation on the induction conveyor 136.

If the result of the evaluation at step 258 is that the component 144 is not at the proper orientation, then at step 260, the operation cycle of the robot 106 can be interrupted. A corrective action can then be taken at step 260 to re-position the placed component 144 at the proper orientation. For example, according to certain embodiments, the robot 106 can engage the component 144, such as, for example, re-grasp the component 144 with the end effector 108, and attempt to re-position the component 144 at the proper orientation on the induction conveyor 136.

At step 262, a determination can be made as to whether action(s) taken at step 260 have resulted in the component 144 being at the proper orientation in the selected space 138 on the induction conveyor 136. Such a determination can include the second perception system 115 capturing another conveyor component image(s) that can be evaluated for a determination of whether the component 144 is, or is not, at the proper orientation on the induction conveyor 136. If at step 262, a determination is made that further corrective action is required, then steps 260 and 262 can again be repeated. Further, a counter or additional tracking device or method can track the number of times that corrective actions taken at step 260 have been determined at step 262 to have failed to result in the component 144 being at the proper orientation. If the number of attempted, but failed, corrective actions exceeds a predetermined number, such as, for example, three determinations at step 262 that the corrective actions of step 260 have failed to remedy the issue, then at step 264 a signal or other notification can be generated and provided to the operator of the robotic station 102 or the management system 104 that provides notification of the issue.

If at step 258 it is determined that the component 144 is at the proper orientation, or if it is subsequently determined at step 262 that, via the corrective action of step 260, the component 144 has been repositioned to attain the proper orientation, then at step 266, an inquiry can be made as to whether a sorter position 138, 140 on the sorter conveyor 166 to which the component 144 will be transferred from the induction conveyor 136 is available for receipt of the component 144. The timing of the availability of the sorter position 138, 140 on the sorter conveyor 166 can be based on a variety of factors, including, for example, the speed the belt of the sorter conveyor 166 and/or the coordinated operation of the sorter conveyor 166 with other equipment, among other factors.

Moreover, according to certain embodiments, at least a portion of the robotic singulation system 130, such as, for example, the robot station 102, among others, is at least communicatively coupled to the sorter conveyor 166 and/or other system that controls or manages at least a portion of the operation of the sorter conveyor 166. According to such embodiments, the robotic singulation system 130, or portion thereof, can, for example, inquire as to whether a sorter position 138, 140 is available. Such an inquiry can include, for example, looking into an upstream queue on the sorter conveyor 166 to find upcoming available sorter positions 140 that can be pre-selected as the sorter position 138 that is to receive the component 144. Such pre-selection of the sorter position 138 can be based on a variety of factors, including the sorter position 138 being empty, the speed of the belt(s) 168 of the sorter conveyor 166, and/or a time delay for the robotic singulation system 130 to operably react to this information and/or to transfer the component 144 to the pre-sorter position 138, including to complete the operation of transferring, or shooting, the component 144 from the induction conveyor 136 to the pre-selected sorter position 138 on the sorter conveyor 166. According to certain embodiments, the timing associated with the transfer of the component 144 from the induction conveyor 136 to the pre-selected sorter position 136 can be assumed to be generally consistent. For example, when a component 144 is placed onto induction conveyor 136, the belt 162 of the induction conveyor 166, which can be controlled by analog output from robot 106, moves relatively slowly forward until the component 144 breaks a photo eye at the leading edge of the induction conveyor 166 that is closest to sorter conveyor 166. By stopping at a generally fixed or set position on the induction conveyor 136, the component 144 has a generally fixed distance to traverse to reach the sorter position 138. Thus, despite possible physical differences in components 144 that may be picked from the picking bin 132 and placed on the induction conveyor 136 during different operation cycles or runs of the robot 106 and/or of the robotic singulation system 130, the distance that the component 144 is to traverse from the induction conveyor 136 to the sorter position 138 is generally consistent, regardless of the size of the component 144. Thus the time associated with the operation of the robot 106 and the transfer of the component to the sorter conveyor 166 from the induction conveyor 136 is generally consistent, even for components 144 of varying sizes.

If the inquiry at step 266 indicates the sorter position 138, 140 of the sorter conveyor 166 is currently unavailable to receive the component 144, then at step 268 the robot 106 can wait for the sorter position 138, 140 to become available. As shown in FIG. 7D, according to certain embodiments, such waiting can include the robot 106 attempting at step 270 to pick another component 144 from the picking bin 132. If however, the picking bin 132 no longer contains any components 144, then, at step 272, while the robot 106 is waiting for a sorter position 138, 140 on the sorter conveyor 166 to become available, a request can be made to deliver another tote 146 containing additional components 144 to the robotic singulation system 130. Such a request can be communicated in a variety of manners, including, for example, by a request made by use of the management system 104. If however at step 266 a determination is made that the next sorter position 138, 140 is available, then at step 274 the induction conveyor is advanced forward and the component 144 is transferred from the induction conveyor 136 to the sorter position 138, 140 in the sorter conveyor 166.

After all of the components 144 have been removed from the picking bin 132, including, but not limited to, after a determination is made at step 272 that no components 144 remain in the picking bin 132, and at least the picking bin 132 is cleared of components 144, similar to step 218, one or more of the perception systems 114, 115 can then attain one or more other background image(s). This/these new background image(s) can be used in subsequent similar evaluations during the a repeat of at least certain aspects of the process 200 for the components 144 that are provided by the next tote 146 that is delivered to the robotic singulation system 130. Thus, for example, according to certain embodiments, upon the emptying of the picking bin 132 and the removal of the tote 146 that had delivered those components 144, the process 200 can return to step 222 and be repeated using the components 144 of the next tote 146.

Embodiments of the present invention include a method for operating a robot, comprising: providing target data for a target object to a robotic controller; determining whether a pre-pick target for the target object is reachable by the robot; determining whether a pick target is reachable by the robot; and picking up the target object with the robot and depositing the target object at a desired location responsive to a determination that the pre-pick target and the pick target are reachable by the robot.

In a refinement, the method further comprises requesting a new target object responsive to a determination that the pre-pick target is not reachable by the robot.

In another refinement, the method further comprises requesting a new target object responsive to a determination that the pick target is not reachable by the robot.

In yet another refinement, the method further comprises determining a pre-pick target and determining a pick target.

In still another refinement, the target data includes a score for the target object.

In yet still another refinement, the target data includes, X, Y and Z axis data for the target object.

Embodiments of the present invention include a method for operating a robot, comprising: designating a target object in a bin; transmitting target data for the target object to a robot controller; determining whether a pre-pick target for the target object is reachable by the robot; determining whether a pick target for the target object is reachable by the robot; and picking up the target object from the bin with the robot if both the pre-pick target and the pick target are reachable by the robot.

In a refinement, the method further comprises depositing the target robot at a desired location.

In another refinement, depositing the target object at a desired location includes depositing the target onto a flipper conveyor system.

In yet another refinement, the method further comprises determining a pre-pick target, wherein the pre-pick target is a target location wherein a first predetermined plane of an end effector of the robot is parallel to a second predetermined plane of the target object, and offset from the second predetermined plane along a predetermined axis.

In still another refinement, the first predetermined plane is an XY plane of the end effector; wherein the second predetermined plane is an X'Y' plane of the target object, and wherein the predetermined axis is a Z axis of the end effector and/or a Z' axis of the target object.

In yet still another refinement, the method further comprises determining a pick target, wherein the pick target is a target location wherein a first predetermined plane of an end effector of the robot coincides with a second predetermined plane of the target object.

In a further refinement, the first predetermined plane is an XY plane of the end effector; and wherein the second predetermined plane is an X'Y' plane of the target object.

In a yet further refinement, the pick target is a target location wherein a Z axis of the end effector is coincident with a Z' axis of the target object.

Embodiments of the present invention include a method, comprising: capturing, by one or more perception systems, a background image of at least a picking bin; capturing, by the one or more perception systems, a component image of one or more components in the picking bin; determining, based at least in part on an evaluation involving both the component image and the background image, whether a robot can pick at least one of the one or more components from the picking bin; displacing, after determining the robot cannot pick at least one of the one or more components from the picking bin, the one or more components within the picking bin; capturing, by the one or more perception systems, an updated component image of the one or more components in the picking bin after displacing the one or more components within the picking bin; determining, based at least in part on an evaluation involving both the updated component image and the background image, whether the robot can pick at least one of the one or more components from the picking bin; and picking by the robot, after determining the robot can pick at least one of the one or more components from the picking bin, at least one of the one or more components from the picking bin.

In a refinement, the step of displacing the one or more components comprises at least one of the following: (1) stirring the one or more components within the picking bin, and (2) agitating the picking bin.

In another refinement, the step of determining whether the robot can pick one or more components from the picking bin includes subtracting information from the background image from information of the component image to derive a determined pick score for at least one of the one or more components, and wherein the determination of whether the robot can pick at least one of the one or more components from the picking bin comprises determining whether the determined pick score of at least one component satisfies a threshold pick score.

In yet another refinement, the method further includes the step of determining, if the determined pick score for each of the one or more components does not satisfy the threshold pick score, whether the determined pick score for at least one of the one or more components satisfies a threshold stir score, the threshold stir score being lower than the threshold pick score, and wherein if the determined pick score of at least one component satisfies the threshold stir score, the step of displacing the one or more components comprises stirring the component of the one or components within the picking bin that has the highest determined pick score.

In yet another refinement, if the determined pick score of each of the one or more components does not satisfy the threshold stir score, the step of displacing the one or more components comprises agitating the picking bin.

In still another refinement, the method further includes clearing, prior to the step of capturing the one or more background images, at least the picking bin of components that were received in the picking bin for picking by the robot.

In yet still another refinement, the method further includes the steps of: determining if an induction conveyor is empty; holding, by the robot, the at least one of the one or more components that is picked by the robot from the picking bin until the induction conveyor is determined to be empty; placing, when the induction conveyor is determined to be empty, the at least one of the one or more components that is picked by the robot from the picking bin onto the induction conveyor.

In a further refinement, the method further includes the steps of determining whether a sorter position on a sorter conveyor is available to receive the at least one of the one or more components placed on the induction conveyor; and transferring, after the sorter conveyor is determined to be available, the at least one of the one or more components placed on the induction conveyor from the induction conveyor to the supply conveyor.

In a yet further refinement, the method further includes the steps of: capturing, by the one or more perception systems, a conveyor background image of at least a portion of the induction conveyor prior to placement of the at least one component onto the induction conveyor; capturing, by the one or more perception systems, a conveyor component image that includes an area on the induction conveyor at which the robot was to place the at least one component; and verifying by at least an evaluation using both the conveyor background image and the conveyor component image, the presence of the at least one component on the induction conveyor.

In a still further refinement, the method further includes the step of performing, after verifying the presence of the at least one component on the induction conveyor, a quality check of the at least one component.

In a yet still further refinement, the quality check comprises determining a quantity of the at least one component positioned on the induction conveyor.

In another further refinement, the method further includes the steps of adjusting a quantity of the at least one component positioned on the induction conveyor if the quantity does not satisfy a pre-determined value.

In a yet another further refinement, the quality check comprises determining an orientation of the at least one component positioned on the induction conveyor.

In still another further refinement, the step of determining the orientation further comprises determining whether the orientation conforms to a pre-determined orientation, wherein, if the orientation is determined to not conform to the pre-determined orientation, further including the step grasping, by the robot, the at least one component positioned on the induction conveyor and re-positioning the grasped at least one component onto the induction conveyor.

In yet still another further refinement, the method further includes the steps of verifying, after placement of the at least one component onto the induction conveyor, that a sorter position on a sorter conveyor is available to receive the at least one component from the induction conveyor; picking, by the robot, another component from the picking bin; and holding, by the robot, the picked another component until at least the sorter position on the sorter conveyor is available to receive the at least one component.

In an additional further refinement, the sorter position becomes available when the sorter position is empty and in position to receive the at least one component from the induction conveyor.

In another additional further refinement, the method further includes the step of delivering the one or more components from a tote on a supply conveyor to the picking bin.

In yet another additional further refinement, the step of delivering the one or more components from the tote comprises: adjusting an angular orientation of an opening of the tote to facilitate a transfer of the one or more components from the tote to the picking bin; and agitating the tote to facilitate the transfer of one or more components from the tote to the picking bin.

In still another additional further refinement, the method further includes the step of displacing, after the delivering step, at least a portion of an end effector of the robot along a fixed path within the tote to verify the absence of one or more components within the tote.

In yet still another further additional refinement, the method further includes the steps of: determining whether the tote is available for transferring the one or more components to the picking bin; and identifying a product identifier of the tote, the product identifier providing information used to identify at least one characteristic of the one or more components contained in the tote.

In an additional refinement, the at least one characteristic comprises a quantity of the one or more components contained in the tote.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A method for operating a robot, comprising:
providing target data for a target object to a robotic controller, the target data including a score for the target object, the score being based at least in part on a measure of confidence as to a determination by a vision system of a plurality of axes of the target object, and a determination by the vision system of a predetermined plane of the object, the predetermined plane of the object being defined by a pair of axes of the plurality of axes;
determining whether a pre-pick target for the target object is reachable by the robot, the pre-pick target comprising a target location at which a predetermined plane of an end effector of the robot is parallel to, and offset along a predetermined axis from, the predetermined plane of the target object, the predetermined axis comprising an axis perpendicular to the predetermined plane of the target object, perpendicular to the predetermined plane of the end effector, passing through a center of the target object, and passing through a center of the end effector, the predetermined plane of the end effector comprising a plane closest to the predetermined plane of the target, the plane closest including at least one point in the end effector;
determining, if the pre-pick target is determined to be reachable, whether a pick target for the target object is reachable by the robot, the pick target comprising a location along the predetermined axis at which the predetermined plane of the end effector coincides with the predetermined plane of the target object; and
picking up the target object with the robot and depositing the target object at a desired location responsive to a determination that the pre-pick target and the pick target are reachable by the robot.

2. The method of claim 1, further comprising requesting a new target object responsive to a determination that the pre-pick target is not reachable by the robot.

3. The method of claim 1, further comprising requesting a new target object responsive to a determination that the pick target is not reachable by the robot.

4. The method of claim 1, further comprising determining the pre-pick target and determining the pick target.

5. The method of claim 1, further including determining the score for the target object.

6. The method of claim 1, wherein the plurality of axes comprises X, Y and Z axes of the target object.

7. The method of claim 1, further comprising:
capturing, by one or more perception systems, a background image of at least a picking bin;
capturing, by the one or more perception systems, a component image of one or more components in the picking bin, the one or more components in the picking bin comprising at least the target object; and
determining, based at least in part on an evaluation involving both the component image and the background image, whether the robot can pick the target object from the picking bin.

8. The method of claim 7, further including:
displacing, after determining the robot cannot pick at least one of the one or more components from the picking bin, the one or more components within the picking bin;
capturing, by the one or more perception systems, an updated component image of the one or more components in the picking bin after displacing the one or more components within the picking bin;
determining, based at least in part on an evaluation involving both the updated component image and the background image, whether the robot can pick at least one of the one or more components from the picking bin; and
picking by the robot, after determining the robot can pick at least one of the one or more components from the picking bin, at least one of the one or more components from the picking bin.

9. The method of claim 8, wherein the step of determining whether the robot can pick one or more components from the picking bin includes subtracting information from the background image from information of the component image to derive a determined pick score for at least one of the one or more components, and wherein the determination of whether the robot can pick at least one of the one or more components from the picking bin comprises determining whether the determined pick score of at least one component satisfies a threshold pick score.

10. The method of claim 9, wherein the method further includes the step of determining, if the determined pick score for each of the one or more components does not satisfy the threshold pick score, whether the determined pick score for at least one of the one or more components satisfies a threshold stir score, the threshold stir score being lower than the threshold pick score, and wherein if the determined pick score of at least one component satisfies the threshold stir score, the step of displacing the one or more components comprises stirring the component of the one or components within the picking bin that has the highest determined pick score.

11. The method of claim 10, wherein if the determined pick score of each of the one or more components does not satisfy the threshold stir score, the step of displacing the one or more components comprises agitating the picking bin.

12. The method of claim 7, wherein the method further includes clearing, prior to the step of capturing the one or more background images, at least the picking bin of components that were received in the picking bin for picking by the robot.

13. The method of claim 7, further including the steps of:
determining if an induction conveyor is empty;
holding, by the robot, the at least one of the one or more components that is picked by the robot from the picking bin until the induction conveyor is determined to be empty;
placing, when the induction conveyor is determined to be empty, the at least one of the one or more components that is picked by the robot from the picking bin onto the induction conveyor.

14. The method of claim 13, further including the steps of:
determining whether a sorter position on a sorter conveyor is available to receive the at least one of the one or more components placed on the induction conveyor; and
transferring, after the sorter conveyor is determined to be available, the at least one of the one or more components placed on the induction conveyor from the induction conveyor to the supply conveyor.

15. The method of claim 13, further including the steps of:
capturing, by the one or more perception systems, a conveyor background image of at least a portion of the induction conveyor prior to placement of the at least one component onto the induction conveyor;
capturing, by the one or more perception systems, a conveyor component image that includes an area on the induction conveyor at which the robot was to place the at least one component; and
verifying by at least an evaluation using both the conveyor background image and the conveyor component image, the presence of the at least one component on the induction conveyor.

16. The method of claim 15, further including the step of performing, after verifying the presence of the at least one component on the induction conveyor, a quality check of the at least one component.

17. The method of claim 16, wherein the quality check comprises determining a quantity of the at least one component positioned on the induction conveyor.

18. The method of claim 17, further including the steps of adjusting a quantity of the at least one component positioned on the induction conveyor if the quantity does not satisfy a pre-determined value.

19. The method of claim 16, wherein the quality check comprises determining an orientation of the at least one component positioned on the induction conveyor.

20. The method of claim 19, wherein the step of determining the orientation further comprises determining whether the orientation conforms to a pre-determined orientation,
wherein, if the orientation is determined to not conform to the pre-determined orientation, further including the step grasping, by the robot, the at least one component positioned on the induction conveyor and re-positioning the grasped at least one component onto the induction conveyor.

21. The method of claim 13, further including the steps of:
verifying, after placement of the at least one component onto the induction conveyor, that a sorter position on a sorter conveyor is available to receive the at least one component from the induction conveyor;
picking, by the robot, another component from the picking bin; and
holding, by the robot, the picked another component until at least the sorter position on the sorter conveyor is available to receive the at least one component.

22. The method of claim 21, wherein the sorter position becomes available when the sorter position is empty and in position to receive the at least one component from the induction conveyor.

23. The method of claim 7, further including the step of delivering the one or more components from a tote on a supply conveyor to the picking bin.

24. The method of claim 23, wherein the step of delivering the one or more components from the tote comprises:
adjusting an angular orientation of an opening of the tote to facilitate a transfer of the one or more components from the tote to the picking bin; and
agitating the tote to facilitate the transfer of one or more components from the tote to the picking bin.

25. The method of claim 24, further including the step of displacing, after the delivering step, at least a portion of an end effector of the robot along a fixed path within the tote to verify the absence of one or more components within the tote.

26. The method of claim 23, further including the steps of:
determining whether the tote is available for transferring the one or more components to the picking bin; and
identifying a product identifier of the tote, the product identifier providing information used to identify at least one characteristic of the one or more components contained in the tote.

27. The method of claim 26, wherein the at least one characteristic comprises a quantity of the one or more components contained in the tote.

28. A method for operating a robot, comprising: designating a target object in a bin;
transmitting target data for the target object to a robot controller, the target data including a score for the target object, the score being based at least in part on a measure of confidence as to a determination by a vision system of a plurality of axes of the target object, and a determination by the vision system of a predetermined plane of the object, the predetermined plane of the object being defined by a pair of axes of the plurality of axes;
determining whether a pre-pick target for the target object is reachable by the robot, the pre-pick target comprising a first target location at which a predetermined plane of an end effector of the robot is parallel to, and offset along a predetermined axis from, the predetermined plane of the target object, the predetermined axis comprising an axis perpendicular to the predetermined plane of the target object, perpendicular to the predetermined plane of the end effector, passing through a center of the target object, and passing through a center of the end effector, the predetermined plane of the end effector comprising a plane closest to the predetermined plane of the target, the plane closest including at least one point in the end effector;
determining whether a pick target for the target object is reachable by the robot, the pick target comprising a second target location along the predetermined axis at which the predetermined plane of the end effector coincides with the predetermined plane of the target object; and picking up the target object from the bin with the robot if both the pre-pick target and the pick target are reachable by the robot.

29. The method of claim 28, further comprising depositing the target robot at a desired location.

30. The method of claim 29, wherein depositing the target object at a desired location includes depositing the target onto a flipper conveyor system.

31. The method of claim 28, further comprising determining the pre-pick target.

32. The method of claim 31, wherein the predetermined plane of the end effector is an XY plane of the end effector; wherein the predetermined plane of the target object is an X'Y' plane of the target object, and wherein the predetermined axis is a Z' axis of the target object.

33. The method of claim 28, further comprising determining the pick target.

34. The method of claim 33, wherein the predetermined plane of the end effector is an XY plane of the end effector; and wherein the predetermined plane of the target object is an X'Y' plane of the target object.

35. The method of claim 34, wherein the pick target further comprises a target location wherein a Z axis of the end effector is coincident with a Z' axis of the target object.

\* \* \* \* \*